(12) United States Patent
Soederberg et al.

(10) Patent No.: US 11,938,404 B2
(45) Date of Patent: Mar. 26, 2024

(54) METHOD OF CREATING A VIRTUAL GAME ENVIRONMENT AND INTERACTIVE GAME SYSTEM EMPLOYING THE METHOD

(71) Applicant: LEGO A/S, Billund (DK)

(72) Inventors: Jesper Soederberg, Galten (DK); Philip Kongsgaard Døssing, Aarhus C (DK); Andrei Zavada, Horsens (DK); Bjørn Carlsen, Kolding (DK)

(73) Assignee: LEGO A/S, Billund (DK)

( * ) Notice: Subject to any disclaimer, the term of this patent is extended or adjusted under 35 U.S.C. 154(b) by 0 days.

(21) Appl. No.: 17/945,354

(22) Filed: Sep. 15, 2022

(65) Prior Publication Data
US 2023/0068796 A1    Mar. 2, 2023

Related U.S. Application Data

(62) Division of application No. 15/751,073, filed as application No. PCT/EP2016/069403 on Aug. 16, 2016, now Pat. No. 11,504,623.

(30) Foreign Application Priority Data

Aug. 17, 2015 (DK) .......................... PA 2015 70531

(51) Int. Cl.
*A63F 13/655* (2014.01)
*A63F 13/213* (2014.01)
(Continued)

(52) U.S. Cl.
CPC .......... *A63F 13/655* (2014.09); *A63F 13/213* (2014.09); *A63F 13/65* (2014.09); *A63F 13/98* (2014.09); *G06T 15/08* (2013.01)

(58) Field of Classification Search
CPC ...... A63F 13/655; A63F 13/213; A63F 13/65; A63F 13/98; G06T 15/08
See application file for complete search history.

(56) References Cited

U.S. PATENT DOCUMENTS 253,711 A    2/1882 Inman
3,005,282 A    10/1961 Christiansen
(Continued)

FOREIGN PATENT DOCUMENTS

CN    103582902 A    2/2014
EP    2714222 A1    4/2014
(Continued)

OTHER PUBLICATIONS

L. F. M. S. Silva, V. F. Pamplona and J. L. D. Comba, "Legolizer: A Real-Time System for Modeling and Rendering LEGO Representations of Boundary Models," 2009 XXII Brazilian Symposium on Computer Graphics and Image Processing, Rio de Janeiro, Brazil, 2009, pp. 17-23 (Year: 2009).*
(Continued)

*Primary Examiner* — Justin L Myhr
*Assistant Examiner* — Carl V Larsen
(74) *Attorney, Agent, or Firm* — Day Pitney LLP; George N. Chaclas; Anthony A. Kassas

(57) ABSTRACT

The invention relates to a method of creating a virtual game environment. The method comprises: selecting one or more physical objects according to pre-determined physical properties; providing a physical model of the game environment/scene using the selected physical objects; scanning the physical model to obtain a digital three dimensional representation of the physical model including information on the pre-determined physical properties; converting the digital three-dimensional representation of the physical model into a virtual toy construction model made up of virtual toy construction elements; and defining game-controlling elements in the virtual toy construction model using information on the pre-determined physical properties, thereby creating the virtual game environment/scene. The invention
(Continued)

further relates to an interactive game system including an implementation of the method.

11 Claims, 18 Drawing Sheets

(51) Int. Cl.
  *A63F 13/65* (2014.01)
  *A63F 13/98* (2014.01)
  *G06T 15/08* (2011.01)

(56) References Cited

U.S. PATENT DOCUMENTS

| | | | |
|---|---|---|---|
| 6,249,600 | B1 | 6/2001 | Reed et al. |
| 6,259,815 | B1 | 7/2001 | Anderson et al. |
| 6,867,774 | B1* | 3/2005 | Halmshaw .............. G06T 15/08 345/424 |
| 6,952,204 | B2 | 10/2005 | Baumberg et al. |
| 7,092,899 | B2 | 8/2006 | Simas et al. |
| 7,439,972 | B2 | 10/2008 | Timcenko |
| 8,217,939 | B1* | 7/2012 | Bonciu ................... G06T 17/00 345/611 |
| 8,953,024 | B2 | 2/2015 | Wang et al. |
| 9,245,363 | B2 | 1/2016 | Laine |
| 9,675,895 | B2 | 6/2017 | Judkins et al. |
| 10,213,692 | B2 | 2/2019 | Velic et al. |
| 10,646,780 | B2 | 5/2020 | Laulund et al. |
| 2004/0177007 | A1 | 9/2004 | Van Luchene |
| 2005/0059483 | A1 | 3/2005 | Borge |
| 2010/0271368 | A1 | 10/2010 | McNamara et al. |
| 2010/0302247 | A1 | 12/2010 | Perez et al. |
| 2011/0028212 | A1 | 2/2011 | Krien |
| 2011/0298922 | A1* | 12/2011 | Horovitz ................. A63F 13/63 382/165 |
| 2012/0190452 | A1 | 7/2012 | Weston et al. |
| 2012/0194517 | A1 | 8/2012 | Izadi et al. |
| 2012/0264510 | A1 | 10/2012 | Wigdor et al. |
| 2012/0295703 | A1 | 11/2012 | Reiche et al. |
| 2012/0304059 | A1 | 11/2012 | McCloskey |
| 2012/0306853 | A1 | 12/2012 | Wright et al. |
| 2014/0015813 | A1 | 1/2014 | Numaguchi et al. |
| 2014/0256430 | A1 | 9/2014 | Matsumura |
| 2014/0267266 | A1* | 9/2014 | Crassin ................... G06T 17/00 345/424 |
| 2014/0273717 | A1 | 9/2014 | Judkins et al. |
| 2014/0362228 | A1 | 12/2014 | McCloskey et al. |
| 2014/0378023 | A1 | 12/2014 | Muthyala et al. |
| 2015/0123965 | A1* | 5/2015 | Molyneaux .............. G06T 19/20 345/419 |
| 2015/0356787 | A1* | 12/2015 | Abe .................... G06F 3/04815 345/633 |
| 2016/0151979 | A1* | 6/2016 | Urban ................... B29C 64/112 425/130 |
| 2016/0189397 | A1 | 6/2016 | Mullins et al. |
| 2016/0225164 | A1* | 8/2016 | Tomlin ................. G02B 27/017 |
| 2017/0189797 | A1 | 7/2017 | Muthyala et al. |
| 2017/0225073 | A1 | 8/2017 | Laulund et al. |
| 2018/0108176 | A1* | 4/2018 | Yonesaka ................ G06T 17/00 |
| 2018/0264365 | A1 | 9/2018 | Soederberg et al. |
| 2019/0240581 | A1 | 8/2019 | Walker et al. |

FOREIGN PATENT DOCUMENTS

| | | | |
|---|---|---|---|
| EP | 2749327 | A1 | 7/2014 |
| WO | 2011017393 | A1 | 2/2011 |
| WO | 2012170444 | | 12/2012 |
| WO | 2013173465 | A1 | 11/2013 |
| WO | 2014105920 | A1 | 7/2014 |
| WO | 2016075081 | A1 | 5/2016 |
| WO | 2017029279 | A2 | 2/2017 |
| WO | 2018007369 | A1 | 1/2018 |
| WO | 2018069269 | A1 | 4/2018 |

OTHER PUBLICATIONS

Rosen, David. Triangle mesh voxelization. wolffiregames.com. Online. 2009. Accessed via the Internet. Accessed Jul. 28, 2023. <URL: http://blog.wolfire.com/2009/11/Triangle-mesh-voxelization> (Year: 2009).*
1 EPO Communication in Application No. 19734060.7-1210, dated Nov. 7, 2022, 4 pages.
Ashraf Masaood Kibriya, "Fast Algorithms for Nearest Neighbour Search", Mar. 31, 2007, XP055351654, Hamilton, New Zealand. URL: http://researchcommons.waikato.ac.nz/bitstream/handle/10289/2463/thesis.pdf?sequence=2&isAllowed=y [retrieved from the internet on Mar. 6, 2017].
Anonymous, "What is the best algorithm for finding the closest color in an array to another color?—Stack Overflow", May 6, 2014, XP055351622. URL: http://stackoverflow.com/questions/1720528/what-is-the-best-algorithm-for-finding-the-closest-color-in-an-array-to-another.
Anonymous, "language agnostic—Best algorithm for matching colours.—Stack Overflow", Jul. 14, 2014, XP055351637. URL: http://stackoverflow.com/questions/1678457/best-algorithm-for-matching-colours/1678498#1678498. [retrieved from the internet on Mar. 6, 2017].
Clarkson, Kenneth, "Nearest Neighbour Searching in Metric Spaces", Jan. 1, 1999, XP055353760. URL: https://graphics.stanford.edu/courses/cs468-06-fall/slides/sid2.pdf [retrieved from the internet on Mar. 10, 2017].
Ichihashi et al., "PCA-Tree NNS with two approximation methods and annulus bound method", Soft Computing and Intelligent Systems (SCIS) and 13th International Symposium On Advanced Intelligent Systems (ISIS), 2012 Joint 6th International Conference on, IEE, Nov. 20, 2012, pp. 1999-2003, XP032375990, DOI: 10.1109/SCIS-ISIS.2012.6505109, ISBN: 978-1-4673-2742-8.
International Search Report issued in corresponding international application No. PCT/EP2016/069403, dated Mar. 22, 2017.
Game Level. www.webopedia.com. Online. Aug. 11, 2014. Accessed via the Internet. Accessed May 7, 2020 URL: https://web.archive.org/web/20140811195629/https://www.webopedia.com/TERM/G/game_level.html (Year: 2014).
Anonymous: "Converting tri model to voxel model—graphics—Devmaster Forum", Jan. 31, 2011 (Jan. 31, 2011), XP055352935 URL: http://forum.devmatster.net/t/converting-tri-model-to-voxel-model/19085/5 [Retrieved from the Internet on Mar. 8, 2017].
International Preliminary Report on Patentability with amended set of claims issued in corresponding international application No. PCT/EP2016/069403, dated Oct. 12, 2017.
DKPTO's Search Report and Search Opinion issued in Danish priority patent application No. PA 2015 70531, dated Mar. 15, 2016.
Written Opinion of the International Search Authority issued in corresponding international application No. PCT/EP2016/069403, dated Mar. 22, 2017.
First Office Action with Search Report issued in corresponding Chinese patent application No. CN201680060414.0, dated Jul. 24, 2020, 10 pages.
First Office Action with Search Report issued in corresponding Chinese patent application No. CN201680060414.0, dated Jul. 24, 2020 (with translation), 14 pages.
Water Arrow. thief.fandom.com. Online. Sep. 11, 2014. Access via the Internet. Access May 7, 2020. URL: https://thief.fandom.com/wiki/Water_Arrow?oldid=65877 (Year: 2014).
International Search Report issued in corresponding international application No. PCT/EP2019/066886, dated Sep. 5, 2019, 5 pages.
Danish Search Report issued in corresponding Danish patent application No. PA 2018704666, dated Jan. 14, 2019, 4 pages.
Result of Consultation issued in European patent application No. 16753350.4, mailed Dec. 1, 2022, 12 pages.
Uznanski Dan: "Grid-from Wolfram MathWorld", pp. 1-1, XP055876100, Retrieved from the Internet: URL:https://mathworld.wolfram.com/Grid.html [retrieved on Jan. 4, 2022].

* cited by examiner

US 11,938,404 B2

METHOD OF CREATING A VIRTUAL GAME ENVIRONMENT AND INTERACTIVE GAME SYSTEM EMPLOYING THE METHOD

CROSS-REFERENCE TO RELATED APPLICATIONS

The present application is a Divisional of and claims the benefit of U.S. patent application Ser. No. 15/751,073, filed Feb. 7, 2018 and published on Sep. 20, 2018 as U.S. Patent Publication No. 2018/0264365 A1, which is a U.S. National Stage Application of International Application No. PCT/EP2016/069403, filed on Aug. 16, 2016 and published on Feb. 23, 2017 as WO 2017/029279 A2, which claims the benefit and priority of Danish Patent Application No. PA 201570531, filed on Aug. 17, 2015, each of which is incorporated herein by reference in its entirety for any purpose whatsoever.

FIELD OF THE DISCLOSURE

The present disclosure relates in one aspect to methods of creating a virtual game environment. According to a further aspect, the disclosure relates to an interactive game system implementing one or more of the methods of creating a virtual game environment. According to a yet further aspect the disclosure relates to a method of playing an interactive game using one or more of the methods of creating a virtual game environment. According to yet another aspect, the present disclosure relates to image processing and, in particular, to voxelization.

BACKGROUND

Different attempts of integrating virtual representations of physical objects into a virtual game play have been made. However, a close link between the physical world and a virtual game play stimulating the interactive involvement of the user and, in particular, stimulating the development of different skills by children's game playing is still missing. Therefore, according to at least one aspect disclosed herein, there is a need for a new approach to interactive game play.

In many image processing methods, e.g. when creating a virtual representation of physical objects into a virtual game play, it is often desirable to create a three-dimensional (3D) digital three-dimensional representation of an object in a 3D voxel space, a process referred to as voxelization.

Conventional techniques for rendering 3D models into two-dimensional (2D) images are directed towards projecting 3D surfaces onto a 2D image plane. The image plane is divided into a 2D array of pixels (picture elements) that represent values corresponding to a particular point in the image plane. Each pixel may represent the color of a surface at a point intersected by a ray originating at a viewing position that passes through the point in the image plane associated with the pixel. The techniques for rendering 3D models into 2D images include rasterization and raytracing.

Voxelization can be regarded as a 3D counterpart to the 2D techniques discussed above. Instead of projecting 3D surfaces onto a 2D image plane, 3D surfaces are rendered onto a regular grid of discretized volume elements in a 3D space. A voxel (volumetric picture element) is a volume element, such as a cube, that represents a value of a 3D surface or solid geometric element at a point in the 3D space.

There are multiple techniques for rendering 3D model data into a 3D image comprising a plurality of voxels, see e.g. U.S. Pat. Nos. 9,245,363, 8,217,939 or 6,867,774.

Nevertheless, at least according to one aspect disclosed herein, it remains desirable to provide alternative methods and, in particular, methods that are computationally efficient.

SUMMARY

Some aspects disclosed herein relate to a computer-implemented method of creating a virtual game environment from a real-world scene, the method comprising:
  obtaining a digital three-dimensional representation of a real-world scene, the real-world scene comprising a plurality of physical objects, the digital three-dimensional representation representing a result of at least a partial scan of the real-world scene by a capturing device,
  creating the virtual game environment from the digital three-dimensional representation.

Hence, the real-world scene is used as a physical model from which the virtual game environment is constructed. The virtual game environment may also be referred to as a virtual game scene.

In particular, a first aspect of the disclosure relates to a method of creating a virtual game environment or virtual game scene, the method comprising the following steps.
  1. Selecting one or more physical objects;
  2. Providing a physical model of the game environment/scene using the selected physical objects;
  3. targeting the physical model with a capturing device, such as a camera;
  4. at least partially scanning the physical model with the capturing device to obtain a digital three-dimensional representation of the physical model including information on one or more, e.g. pre-determined, physical properties of one or more of the physical objects;
  5. converting the digital three-dimensional representation of the physical model into a virtual toy construction model made up of virtual toy construction elements; and
  6. defining game-controlling elements in the virtual toy construction model, wherein the game-controlling elements are defined using the information on the pre-determined physical properties, thereby creating the virtual game environment/scene, In a first step, a user selects one or more physical objects, e.g. according to pre-determined physical properties. Typically, the physical objects are everyday items, such as found and readily available in many homes and in particular in the environment of the user. Non-limiting examples for such everyday items may be bottles, books and boxes, cups and colour pencils, pots and pans, dolls, desk top tools, and toy animals. Also toys and toy construction models made of physical toy construction elements may be part of the pool of selected objects.

The objects may be selected according to pre-determined physical properties. The physical properties should be directly detectable by an adequate sensor device. Most preferably, however, the physical properties are optically/visually detectable and suited to be captured by an adequate camera. By predetermined physical properties it is meant that the respective physical properties are associated with a predetermined set of conversion rules for translating the physical properties of the physical objects into virtual properties in a virtual game environment/scene to be created.

The set of conversion rules may be determined beforehand. Preferably, according to some embodiments, at least some of the conversion rules are made available to the user at least during a selection phase. The rules may be made available in any form, e.g. as construction hints in the course of a game, as a sheet, or as retrievable help information. In some embodiments, the conversion rules are static while, in other embodiments, the conversion rules are adaptive. For example, all adaptive conversion rule may depend on detected properties of the real-world scene and/or on one or more other parameters, such as the time of day, a position (e.g. as determined by GPS coordinates) of the camera, a user profile of the user, and/or the like. For example, the process may have stored a set of conversion rules and select one of the conversion rules. The selection may be based on a user-selection and/or based on one or more other parameters, e.g. on detected properties of the real-world scene and/or other parameters as described above.

Preferably, a given physical property and an associated virtual property are ones that are immediately apparent to the user so as to allow for establishing a clearly understandable link between the given physical property and the virtual property to be derived from the given physical property. While an understandable link between a physical property and a virtual property to be derived from this physical property is useful for being able to wilfully create a certain game scene, it is still possible to maintain an element of surprise in the game, by holding back certain details of a virtual implementation that is to be derived from a given physical property. For example, a virtual property may be allowed to evolve during the course of a game, may be made prone to non-playing characters, may spawn resources, or may even have influence on the flow of a game to be played in the game environment/scene. Typically, the physical properties of the physical objects are one or more of contour/shape, dimensions (length, width and/or height), and colour of the objects or of respective parts of the objects.

Advantageously, the set of conversion rules to be applied depends on the game context/theme within which the game scene is to be created. For, example in one game context/theme red colours may be associated with a lava landscape, and a high, red box may become a square-edged lava mountain. In a different game context all objects may be associated with trees and plants of a virtual forest landscape, and red colours on a physical object would only be associated with red flowers.

In some embodiments, the process selects the set of conversion rules based on one or more recognized objects within the real-world scene. For example, the process may recognize one or more physical objects that are associated with a predetermined theme, e.g. a tractor, a farmer miniature figure, or a farmhouse may be associated with a farm theme. Responsive to the recognition of one or more objects having associated a theme, the process may select a set of conversion rules that result in the creation of a virtual game environment matching the theme associated with the recognised objects. Additionally or alternatively, the process may select a matching set of game rules and/or matching game-controlling elements responsive to the recognized object. For example, responsive to recognising the tractor, the farmer miniature figure and/or the farmhouse, the process may select a set of conversion rules that result in the creation of a virtual farming landscape, e.g. including game rules for e.g. a nurturing game and/or game controlling elements including e.g. the growth of crops, movement or other development of virtual farm animals, etc.

Scale related properties such as "high", "low" or "mid-size" may be defined with respect to a reference dimension determined beforehand. For example, the scale may be determined with reference to the size of a physical miniature figure, which in its corresponding virtual representation is used as a user-controllable virtual character, e.g. as a playable character for the user in the game. In other embodiments, the scale may be determined with reference to the size of another recognised physical object in the real world scene. In yet other embodiments, the scale may be determined from the dimensions of a base—e.g. a base plate or mat—on which the user arranges the physical objects. In yet further embodiments, the scale may be determined using information from a range finder of the camera or another mechanism of determining a camera position relative to the real-world scene.

In a second step the user provides a physical model of the game environment/scene using the selected physical objects. Preferably, the physical model of the game environment/scene is formed by arranging the selected physical objects with respect to each other in a real-world scene to shape a desired landscape or other environment. Further preferably, the physical objects are arranged within a limited area, e.g. on a table or a floor space, defining a zone of a given physical size. For example, the physical model may be such that it fits into a cube having edges of no more than 2 m such as no more than 1.5 m, such as no more than 1 m.

In a third step, the physical model is targeted with a capturing device, e.g. a capturing device including a camera. Preferably, the capturing device is a 3D capturing device. Preferably, the 3D capturing device includes a 3D sensitive camera, such as a depth sensitive camera combining high resolution image information with depth information. An example for a depth sensitive camera is the Intel® RealSense™ 3D camera, such as the model F200 available in a developer kit from Intel Corporation. The capturing device communicates with a display showing the scene as seen by the capturing device. The capturing device and the display further communicate with a processor and data storage. Preferably, the capturing device, the processor and/or the display are integrated in a single mobile device, such as a tablet computer, a portable computer or the like. Alternatively, according to some embodiments, a capturing device or a mobile device with a capturing device may communicate with a computer, e.g. by wireless communication with a computing device comprising a processor, data storage and a display. Preferably, additional graphics is shown on the display, such as an augmented reality grid indicating a field of image capture. The additional graphics may be shown as an overlay to the image of the scene shown by the display, wherein the overlay graphics shows what part of the physical model will be captured by the 3D capturing device. Preferably, according to some embodiments, the targeting step includes an augmented reality element with a pre-determined measuring scale, e.g. indicating on the display a fixed size area to be captured, such as an area of 2 m by 2 m or of one by one meter. The usefulness of the targeting step enhanced by augmented reality may depend on the type of game play for which the game environment/scene is to be created. In certain embodiments, the targeting step enhanced by augmented reality may therefore be omitted. For example, the augmented reality targeting step may be useful when creating a game environment/scene for a role playing game with action and resources, whereas such a step may not be necessary for the creation of a race track for a racing game.

In a fourth step, the capturing device is moved around the physical model while capturing a series of images, thereby, at least partially, scanning the physical model to obtain a digital three-dimensional representation of the physical model including information on said physical properties. Most preferably, the information on the physical properties is linked to locations in the digital three-dimensional representation corresponding to the location of the associated physical objects. A partial scan of a closed object may, for example, be used to create an entrance to the object in the virtual representation thereof, by leaving an opening where the scan is incomplete. The digital three-dimensional representation may e.g. be a point cloud, a 3D mesh or another suitable digital three-dimensional representation of the real-world scene. Preferably the capturing device also captures physical properties such as color and/or texture and/or transparency of the objects. The digital three-dimensional representation may also be referred to as virtual three-dimensional representation.

In a fifth step, the digital three-dimensional representation of the physical model is converted into a virtual toy construction model made up of virtual toy construction elements. To this end, the process may apply the set of conversion rules.

In some embodiments, the virtual toy construction elements correspond to physical toy construction elements in that they are direct representations of the physical toy construction elements having the same shape and proportions.

The physical toy construction elements may comprise coupling members for detachably interconnecting the toy construction elements with each other. The coupling members may utilise any suitable mechanism for detachably connecting construction elements with other construction elements. In some embodiments, the coupling members comprise one or more protrusions and one or more cavities, each cavity being adapted to receive at least one of the protrusions in a frictional engagement.

In some embodiments, the toy construction elements may adhere to a set of constraints, e.g. as regards to their shapes and size and/or as regards the positions and orientations of the coupling members and to the coupling mechanism employed by the coupling members. In some embodiments, at least some of the coupling members are adapted to define a direction of connection and to allow interconnection of each construction element with another construction element in a discrete number of predetermined relative orientations relative to the construction element. Consequently, a large variety of possible building options are available while ensuring interconnectivity of the building elements. The coupling members may be positioned on grid points of a regular grid, and the dimensions of the toy construction elements may be defined as integer multiples of a unit length defined by the regular grid.

The physical toy construction elements may be defined by a predetermined length unit (1 L.U.) in the physical space, wherein linear dimensions of the physical toy construction element in a Cartesian coordinate system in x-, y-, and z-directions of the physical space are expressed as integer multiples of the predetermined length unit in the physical space (n L.U.'s). Accordingly, the virtual toy construction elements may be defined by a corresponding pre-determined length unit, wherein linear dimensions of the virtual toy construction elements in a Cartesian coordinate system in x-, y-, and z-directions of the virtual space are expressed as integer multiples of the corresponding predetermined length unit in the virtual space. Most preferably, the predetermined unit length in the physical space and the corresponding predetermined unit length in the virtual space are the same.

Preferably, the virtual toy construction model is made at a pre-determined scale of the physical objects. Further preferably, the pre-determined scale is 1:1 within an acceptable precision, such as ±20%, such as ±10%, such as ±5%, or even ±2%. Hence, in some embodiments, the virtual toy construction elements correspond to physical toy construction elements of a toy construction system, and the virtual toy construction model is created such that the relative size of the virtual toy construction elements relative to the virtual toy construction model corresponds to the relative size of the corresponding physical toy construction elements relative to the physical objects.

By building the virtual toy construction model at the same, or at least at a comparable scale, the user may, in a building phase, where he/she selects and maybe arranges/re-arranges the physical objects for forming the physical model of the game environment, or even in a game-playing phase perform role playing with a physical miniature figure moving about the real-world scene. A corresponding virtual experience can also be performed with a matching user-controllable character moving around inion the virtual toy construction model in the virtual world. Thereby, an enhanced interactive experience is achieved where the user experiences a closer link between the play in the physical space and in the virtual space.

In a sixth step, game-controlling elements are defined in the virtual toy construction model. Most preferably, the game controlling elements are defined using the information on the physical properties, thereby creating the virtual game environment/scene. The game controlling elements may comprise active/animated properties attributed to locations in the virtual toy construction model according to the information on the physical properties of the physical objects in the corresponding locations of the physical model. The properties may be allowed to evolve, e.g. by growth, degradation, flow, simulated heating, simulated cooling, changes in color and/or surface texture, movement, spawning of resources and/or non-playing characters, etc. Furthermore, the game-controlling element may be defined such that the evolution needs to be triggered/conditioned by actions in the course of the game, coincidence of a plurality of certain physical properties in the physical model, or the like. The game-controlling element may also be defined to require an interaction with the physical model. For example, the game element may hand out a task to be fulfilled for triggering the release of a certain reward or resource, wherein the task includes building/modifying a physical model with certain physical features characterized by a particular combination of physical properties, and subsequently scanning that new physical model.

A simple example of defining a game controlling element is the use of information about a high red box in the physical model as mentioned above. The red and high box may e.g. cause the occurrence of an edged lava-mountain in the virtual world, which may erupt at random times, spawn monsters, that e.g. may compete with the playing character for resources. The lava-mountain may further be enhanced by adding pre-designed assets, such as lava-bubbles in a very hot part of the mountain, and trees, bushes, or crops on the fruitful slopes of the lava-mountain, which may harvested as resources by the playing character. Monsters that the lava region may spawn may have to be defeated as a part of a mission.

Other examples for more advanced game play may involve more complex components in the definition of a game controlling element, such as requiring a plurality of parameters. For example, a physical model building task may require that "water" should meet "ice" at a high altitude, where the user is asked to build and scan a physical model that is half red and half blue.

In some embodiments, defining game-controlling elements in the virtual toy construction model is based on one or more recognised physical objects. In particular, the process may have access to a library of known physical objects, each known physical object having associated with it a three-dimensional digital representation and one or more attributes. Converting the digital three-dimensional representation of the physical model of the game environment/scene into a virtual toy construction model may comprise inserting the three-dimensional digital representation of the recognised physical object into the virtual game environment. In particular, the process may create a virtual object having the one or more attributes associated with the known physical object from the library. Examples of the attributes may include functional attributes, e.g. representing how the virtual object is movable, representing movable parts of the virtual object or other functional features of the virtual object.

The process may thus create a virtual environment as a representation of a modified scene, e.g. as described in greater detail below.

When the virtual game environment/scene is created on the basis of a virtual toy construction model made up of virtual toy construction elements, the virtual game environment/scene may also be modified in the course of the game in a way corresponding to the construction of a physical model using the corresponding physical toy construction elements. Modifications can thus also be made by adding and removing virtual toy construction elements as a part of the game directly in the virtual world. For example, the process may add and/or remove and/or displace virtual toy construction elements responsive to game events such as responsive to user inputs.

Generally, embodiments of the disclosure directly involves and thereby interacts with the environment and physical objects of the user as a part of the game play. Thereby a highly dynamic and interactive game experience is achieved, that not only empowers the user, but also involves and interacts with the user's physical play environment and objects. The particularly interactive nature of the game play enabled by the disclosure stimulates the development of strategy skills, nurturing skills, conflict handling skills, exploration skills, and social skills, Essentially any type of game play can be enabled by creating a virtual game environment/scene in this manner including, but not limited to, nurture-games, battle type games (player vs. player), racing games, and role playing action/resource games. A particular good match for the application of the disclosure is found in games of the role playing action/resource type.

According to yet another aspect, disclosed herein are embodiments of a method for creating a virtual game environment from a real-world scene, the method comprising:
 obtaining a digital three-dimensional representation of a real-world scene, the real-world scene comprising a plurality of physical objects, the digital three-dimensional representation representing a result of at least a partial scan of the real-world scene by a capturing device;
 creating the virtual game environment from the digital three-dimensional representation;
 wherein creating the virtual game environment comprises:
  recognizing at least one of the physical objects as a known physical object;
  creating the virtual game environment responsive to the recognised object.

Recognizing at least one of the physical objects may be based on any suitable object recognition technology. The recognition comprises identifying the physical object as a particular one of a set of known objects. The recognition may be based on identification information communicated by the physical object and/or by identification information that may otherwise be acquired from the physical object. In some embodiments, the recognition may be based on the scanning of the real-world scene. For example, the recognition may be based on the processing of one or more captured images of the real-world scene, e.g. as described in WO 2016/075081 or using another suitable object recognition process. In some embodiments, the physical object may comprise a visible marker such as an augmented reality tag, a QR code, or another marker detectable by scanning the real world scene. In other embodiments, the recognition of the physical object may be based on other detection and recognition technology, e.g. based on an RFID tag included in the physical object, a radio-frequency transmitter such as a Bluetooth transmitter, or another suitable detection and recognition technology.

The digital three-dimensional representation may comprise a plurality of geometry elements that together define a surface geometry and/or a volume geometry of the virtual environment. The geometry elements may e.g. be a plurality of surface elements forming a mesh of surface elements, e.g. a mesh of polygons, such as triangles. In other embodiments the geometry elements may be volume elements, also referred to as voxels. In some embodiments, the geometry elements may be virtual construction elements of a virtual toy construction system, Creating may be as defined in a method according to one of the other aspects.

In some embodiments, the process may have access to a library of known physical objects. The library may be stored on a computer-readable medium, e.g. locally on a processing device executing the method or it may be stored at a remote location and accessible to the processing device via e.g. a computer network such as the Internet. The library may comprise additional information associated with each known physical object such as attributes associated with the physical object, a digital three-dimensional representation of the physical object for use in a digital environment, a theme associated with the known physical object and/or other properties of the physical object.

Creating, the virtual game environment responsive to the recognised object may thus be based on this additional information.

According to some embodiments, creating the virtual game environment responsive to the recognised object comprises:
 creating a virtual object associated with the recognised physical object;
 creating the virtual game environment as a representation of a modified scene, the modified scene corresponding to the real-world scene with the recognised physical object being removed; and
 optionally placing a representation of the created virtual object in the created virtual game environment.

Hence, in some embodiments, the process creates a virtual environment with a created virtual object placed within the virtual environment. In some embodiments, a part of the digital three-dimensional representation represents the recognised physical object. Accordingly a part of a virtual environment created based on the digital three-dimensional representation represents the recognised physical object. In some embodiments, creating the virtual game environment as a representation of a modified scene comprises detecting a part of the digital three-dimensional representation or of the virtual game environment associated with the recognised physical object; and replacing the detected part by a modified part representing a modified scene without the recognised object.

The process may thus create a virtual environment as a representation of a modified scene, the modified scene corresponding to the real-world scene with the recognised physical object being removed. For example, the process may determine a subset of virtual toy construction elements or of other geometry elements of the virtual game environment that correspond to the recognised object. The process may then replace the determined subset with the stored digital three-dimensional representation of the recognised physical object. Alternatively, the process may determine a subset of geometry elements (e.g. surface elements of a 3D mesh) of the digital three-dimensional representation obtained from the scanning process that correspond to the recognised object. The process may then create a modified digital three-dimensional representation where the detected part has been removed and, optionally, replaced by other surface elements. Hence, the modified part may be created from a part of the digital three-dimensional representation in a proximity of the detected part, e.g. surrounding the detected part, e.g. from an interpolation of parts surrounding the detected part. For example, the process may create surface elements based on surface elements in a proximity of the detected part so as to fill a hole in the representation created by the removal of the detected part.

The process may then create the game environment from the modified digital three-dimensional representation.

The virtual object may be a part of the virtual environment or it may be a virtual object that is separate from the virtual environment but that may be placed into the virtual environment and be able to move about the created virtual environment and/or otherwise interact with the virtual environment. Such movement and/or other interaction may be controlled based on game events e.g. based on user inputs. In particular, the virtual object may be a player character or other user-controlled character or it may be a non-player character.

In some embodiments, the recognised physical object may be a toy construction model constructed from a plurality of construction elements. The process may have access to a library of known virtual toy construction models. Accordingly, the virtual object may be represented based on a more accurate digital three-dimensional representation of the individual construction elements than may expediently be achievable from a conventional 3D reconstruction pipeline. Moreover, the virtual toy construction model may have predetermined functionalities associated with it. For example, a wheel may be animated to rotate, a door may be animated to be opened, a fire hose may be animated to eject water, a canon may be animated to discharge projectiles, etc.

According to some embodiments, creating the virtual game environment responsive to the recognised physical object may comprise creating at least a part of the game environment other than the part representing the recognised physical object responsive to the recognised physical object. In particular the part of the game environment other than the part representing the recognised physical object may be created to have one or more game-controlling elements and/or one or more other attributes based on a property of the recognised physical object. In some embodiments, the process creates or modifies the part of the game environment other than the part representing the recognised physical object such that the part represents a theme associated with the recognised physical object.

The part of the game environment other than the part representing the recognised physical object may be a part of the game environment that is located within a proximity of the part representing the recognised physical object. The size of the proximity may be predetermined, controllable by the user, randomly selected or it may be determined based on detected properties of the real world scene, e.g. a size of the recognised physical object. The recognition of multiple physical objects may result in respective parts of the virtual game environment to be modified accordingly. The degree of modification of a part of the game environment may depend on a distance from the recognised physical object, e.g. such that parts that are further away from the recognised physical object are modified to a lesser degree.

According to one aspect, disclosed herein are embodiments of a method for controlling digital game play in a virtual environment. Embodiments of the method comprise performing the steps of an embodiment of a method for creating a virtual game environment disclosed herein and controlling digital game play in the created virtual game environment. Controlling digital game play may comprise controlling one or more virtual objects moving about and/or otherwise interacting with the virtual game environment as described herein.

Some embodiments of the method disclosed herein create a voxel-based representation of the virtual game environment. However, a scanning process often results in a surface representation of the real-world scene from which a voxel-based representation should be created. It is thus generally desirable to provide an efficient process for creating such a representation. For example, a process of creating a virtual toy model from a digital three-dimensional representation of a scanned real-world scene may obtain the digital three-dimensional representation of a surface of the real-world scene. The process may then create a voxel-based representation of the real-world scene and then create a virtual toy construction model from the voxel-based representation, e.g. such that each virtual toy construction element of the virtual toy construction model corresponds to a single voxel or to a plurality of voxels of the voxel-based representation.

Accordingly, another aspect of the disclosure relates to a computer-implemented method of creating a digital three-dimensional representation of an object, the method comprising:

receiving a digital three-dimensional representation of a surface of the object, the digital three-dimensional representation of the surface comprising at least one surface element, the surface element comprising a boundary and a surface area surrounded by said boundary;

mapping the surface onto a plurality of voxels; and creating the digital three-dimensional representation of the object from the identified voxels;

wherein mapping comprises:

for each surface element, defining a plurality of points within said surface element, wherein at least a subset of said plurality of points lie within the surface area of the surface element;

mapping each of the plurality of points on a corresponding voxel.

Mapping individual points into voxel space and, in particular, identifying a voxel into which a given point falls, is a computationally efficient task. For example, the coordinates of the point relative to a coordinate system may be divided by the linear extent of a voxel along the respective axes of the coordinate system. An integer part of the division is thus indicative of an index of the corresponding voxel in voxel space.

The plurality of points are defined such that not all of them are positioned ion the boundary. When the plurality of points are distributed across the surface element, identifying, for each point, which voxel the point falls into, has been found to provide a computationally efficient and sufficiently accurate approximation of the set of voxels that intersect the surface element, in particular when the points are distributed sufficiently densely relative to the size of the voxels.

The voxels may have a box shape, such as a cubic shape or they may have another suitable shape, in particular a representation where the voxels together cover the entire volume without voids between voxels and where the voxels do not overlap. The voxels of a voxel space have typically all the same shape and size. The linear extent of each voxel along the respective coordinate axes of a coordinate system may be the same or different for the different coordinate axes. For example, when the voxels are box-shaped, the edges of the box may be aligned with the respective axes of a coordinate system, e.g. a Cartesian coordinate system. When the box is a cube, the linear extent of the voxel is the same along each of the axes; otherwise the linear extent is different for one or all three axes. In any event, a minimum linear extent of the voxels may be defined. In the case of cubic voxels, the minimum linear extent is the length of the edges of the cube. In the case of box-shaped voxels, the minimum extent is the length of the shortest edge of the box. In some embodiments, the minimum linear extend of the voxels is defined with reference to a predetermined length unit associated with the corresponding virtual toy construction elements, e.g. equal to one such length unit or as an integer ratio thereof, e.g. as ½, ⅓, or the like.

In some embodiments the plurality of points define a triangular planar grid having the plurality of points as grid points of the triangular planar grid where each triangle of the grid has a smallest edge no larger than the minimum linear extent of the voxels and a largest edge no larger than twice the minimum linear extent. In particular, in one embodiment, the largest edge is no larger than twice the minimum linear extent and the remaining edges are no larger than the minimum linear extent. The triangular grid may be a regular or an irregular grid; in particular, all triangles may be identical or they may be different from each other. In some embodiments, the surface element is thus divided into such triangles with the plurality of points forming the corners of the triangles and the triangular grid filling the entire surface element.

The surface element may be a planar surface element, e.g. a polygon such as a triangle. The triangular planar grid is defined in the plane defined by the surface element which may also be a triangle.

In some embodiments, the surface element is a triangle and the plurality of points are defined by:

selecting a first sequence of points on a first edge of the triangle. For example, this may be done by selecting two corners of the triangle and by defining the first sequence of points along the edge connecting the two selected corners, e.g. by defining a sequence of intermediate points lying between the corners such that an initial intermediate point of the sequence has a predetermined distance from one of the corners of the triangle and such that each subsequent intermediate point of the sequence has the same predetermined distance to the previous intermediate point of the sequence. For example, the distance may be equal to the minimum linear extent of the voxels; or it may be the largest length, no larger than the minimum extent of the voxels, by which the first edge is divisible. The first sequence of points is then defined to comprise the sequence of intermediate points. One or both of the corners may further be included in the first sequence.

For each point of the first sequence defining an associated straight line connecting said point and the corner of the triangle that is opposite the first edge; and For each associated straight line, selecting a sequence of further points on said straight line. For example, the sequence of further points may be selected in the same manner as the first sequence of points, with the end points of the associated straight, i.e. by defining a sequence of intermediate points between the end points of the associated straight line and, optionally, by including one or both end points of the associated straight line.

In some embodiments the surface element has one or more surface attribute values of one or more surface attributes associated with it. Examples of attributes include a surface color, a surface texture, a surface transparency, etc. In particular, in some embodiments, the attributes are associated with the surface element as a whole; in other embodiments, respective attributes may be associated with different parts of the surface element. For example, when the boundary of the surface element is a polygon, each corner of the polygon may have one or more attribute values associated with it.

In some embodiments, the method further comprises associating one or more voxel attribute values to each of the voxels of the digital three-dimensional representation; wherein the at least one voxel attribute value is determined from the surface attribute values of one of the surface elements. To this end, mapping each of the plurality of points to a voxel comprises determining a voxel attribute value from the one or more surface attribute values of the surface element. For example, when the surface element is a polygon, and each corner of a polygon has a surface attribute value of an attribute associated with it; determining the voxel attribute value of a voxel mapped to a point may comprise computing a weighted combination, e.g. a weighted average, of the surface attribute values of the respective corners; the weighted combination may be computed based on respective distances between said point and the corners of the polygon.

In some embodiments, one or more of the attributes may only have a set of discrete values. For example, in some embodiments, a color may only have one of a predetermined set of color values, e.g. colors of a predetermined color palette. A restriction to a predetermined set of discrete colors may e.g. be desirable when creating digital three-dimensional representations of physical products that only exist in at set of predetermined colors. Nevertheless, the process of creating a digital three-dimensional representation may receive one or more input colors, e.g. one or more colors associated with a surface element or a voxel. The input color may e.g. result from a scanning process or be computed as a weighted average of multiple input colors, e.g. as described above. Consequently, the input color may not necessarily be one of the colors included in the predetermined set. Therefore, it may be necessary to determine a closest color among a predetermined set of colors, i.e. a color from the set that is closest to the input color.

Accordingly, according to one aspect, disclosed herein are embodiments of a computer-implemented method for identifying a target color of a predetermined set of colors, the target color representing an input color; the method comprising:

representing the input color and each color of the predetermined set of colors in a three-dimensional color space, wherein all colors of the set of colors lie within a ball having an origin and a radius;

determining a current candidate color from the predetermined set of colors;

analysing a subset of the predetermined set of colors to identify an updated candidate color from the subset of the predetermined set of colors wherein the updated candidate color has a smaller distance to the input color than the current candidate color and wherein the subset of the predetermined set of colors only comprises colors of the predetermined set of colors that have a distance from the origin which is no larger than a sum of the distance between the input color and the origin and the distance between the input color and the current candidate color. The distances are computed based on a suitable distance measure in the three-dimensional color space. In an RGB space the distance may be defined as a Euclidean distance. The sum of distances is a scalar sum of the distances.

Hence, by limiting the radius of the search area in color space, the time required for a processing device to search the color space is considerably reduced. To this end, the predetermined set of colors may be represented in a data structure where each color of the predetermined set has associated with it its distance from the origin. In some embodiments, the set may even be ordered according to the distances of the respective colors from the origin. This reduction in computing time is particularly useful when the determination of a closest color needs to be performed for each surface element and/or for each voxel of a digital three-dimensional representation.

In some embodiments, the color space is and RGB color space, but other representations of colors may be used as well.

Embodiments of the methods described herein may be used as part of a pipeline of sub-processes for creating a digital three-dimensional representation of one or more real-world objects or of a real-world scene comprising multiple objects, e.g. by scanning the object or scene, processing the scan data, and creating a digital three-dimensional representation of the object or scene. The created digital three-dimensional representation may be used by a computer for displaying a virtual game environment and/or a virtual object e.g. a virtual object within a virtual environment such as a virtual world. The virtual object may be a virtual character or item within a digital game, e.g. a user-controllable virtual character (such as a player character) or a user-controllable vehicle or other user-controllable virtual object.

According to a further aspect, embodiments are disclosed of a method for creating a virtual toy construction model from a voxel representation of an object. Embodiments of the method may comprise the steps of one or more of the methods according to one of the other aspects disclosed herein. Virtual toy construction models are known from e.g. U.S. Pat. No. 7,439,972. In particular, a virtual toy construction model may be a virtual counterpart of a real-world toy construction model that is constructed from, and comprises, a plurality of physical toy construction elements, in particular elements of different size and/or shape and/or color, that can be mutually interconnected so as to form a physical toy construction model constructed from the physical toy construction elements.

A virtual toy construction system comprises virtual toy construction elements that can be combined with each other in a virtual environment so as to form a virtual toy construction model. Each virtual toy construction element may be represented by a digital three-dimensional representation of said element, where the digital three-dimensional representation is indicative of the shape and size of the element as well as further element properties, such as a color, connectivity properties, a mass, a virtual function, and/or the like. The connectivity properties may be indicative of how a construction elements can be connected to other toy construction elements, e.g. as described in U.S. Pat. No. 7,439,972.

A virtual toy construction model comprises a plurality of one or more virtual toy construction elements that together form the virtual toy construction model. In some embodiments, a virtual toy construction system may impose constraints as to how the virtual toy construction elements may be positioned relative to each other within a model. These constraints may include a constraint that two toy construction elements may not occupy the same volume of a virtual space. Additional constraints may impose rules as to which toy construction elements may be placed next to each other and/or as to the possible relative positions and/or orientations at which two toy construction elements can be placed next to each other. For example, these constraints may model the construction rules and constraints of a corresponding real-world toy construction system.

The present disclosure relates to different aspects including the methods described above and in the following, corresponding apparatus, systems, methods, and/or products, each yielding one or more of the benefits and advantages described in connection with one or more of the other aspects, and each having one or more embodiments corresponding to the embodiments described in connection with one or more of the other aspects and/or disclosed in the appended claims.

According to a further aspect of the disclosure an interactive game system includes a capturing device, a display adapted to show at least image data captured by the capturing device, data storage adapted to store captured data, and programming instructions for the processor, and a processor programmed to directly or indirectly interact with the capturing device or act on the data received directly or indirectly from the capturing device and perform virtual processing steps of one or more of the above-mentioned methods.

In particular, according to one aspect, an interactive game system is configured to:

receive scan data from the capturing device, the scan data being indicative of a physical model of a game environment/scene, the physical model comprising one or more physical objects:

create a digital three-dimensional representation of the physical model, the digital three-dimensional representation including information about one or more physical properties of one or more of the physical objects;

convert the digital three-dimensional representation of the physical model into a virtual toy construction model made up of virtual toy construction elements; and define game-controlling elements in the virtual toy construction model, wherein the game-controlling elements are defined using the information on the physical properties, thereby creating the virtual game environment/scene.

According to another aspect, an interactive game system is configured to:
- receive scan data from the capturing device, the scan data being indicative of a physical model of a game environment/scene, the physical model comprising one or more physical objects;
- create a digital three-dimensional representation of the physical model, the digital three-dimensional representation including information about one or more physical properties of one or more of the physical objects;
- create a virtual game environment from the digital three-dimensional representation; wherein creating the virtual game environment comprises:
  - recognizing at least one of the physical objects as a known physical object;
  - creating the virtual game environment responsive to the recognised object.

The interactive game system may comprise a storage device having stored thereon a library of known physical object as described herein.

Preferably, the capturing device is adapted to provide image data from which three-dimensional scan data can be constructed when moved around a physical model made up of one or more physical objects. Furthermore, the capturing device is adapted to provide data from which physical properties can be derived. Preferably, such physical properties include color and/or linear dimensions that are scaled in absolute and/or relative dimensions. Advantageously, the capturing device is a three-dimensional imaging camera, a ranging camera and/or a depth sensitive camera as mentioned above. The processor is adapted and programmed to receive the image data and any further information about the physical properties captured from the physical model, and process this data to convert the data into a virtual mesh representation of the physical model including the further information, further process the data to convert the mesh representation into a virtual toy construction model made up of virtual toy construction elements, processing the data to define game segments using the virtual toy construction model and the further information, and finally output a virtual game environment/scene. As described herein, the conversion of the mesh representation into a virtual toy construction model may include a process of converting a mesh representation into a voxel representation and converting the voxel representation into a virtual toy construction model.

In an advantageous embodiment, the display communicates with the processor and/or capturing device to provide an augmented reality overlay to the image data shown on the display for targeting the physical model and/or during scanning of the physical model.

In a particularly advantageous embodiment, the capturing device, data storage, processor and display are integrated in a single mobile device, such as a tablet computer, a portable computer, or a mobile phone. Thereby providing a unified game play experience, which may be of particular importance for providing games to technically less experienced users.

The present disclosure further relates to a data processing system configured to perform the steps of an embodiment of one or more of the methods disclosed herein. To this end, the data processing system may comprise or be connectable to a computer-readable medium from which a computer program can be loaded into a processor, such as a CPU, for execution. The computer-readable medium may thus have stored thereon program code means adapted to cause, when executed on the data processing system, the data processing system to perform the steps of the method described herein. The data processing system may comprise a suitably programmed computer such as a portable computer, a tablet computer, a smartphone, a PDA or another programmable computing device having a graphical user-interface. In some embodiments, the data processing system may include a client system, e.g. including a camera and a user interface, and a host system which may create and control a virtual environment. The client and the host system may be connected via a suitable communications network such as the internet. Embodiments of the data processing system may implement an interactive game system as described herein.

Generally, here and in the following the term processor is intended to comprise any circuit and/or device and/or system suitably adapted to perform the functions described herein. In particular, the above term comprises general- or special-purpose programmable microprocessors, such as a central processing unit (CPU) of a computer or other data processing system, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof. The processor may be implemented as a plurality of processing units.

Some embodiments of the data processing system Include a capturing device such as an image capturing device, e.g. a camera, e.g. a video camera, or any other suitable device for obtaining one or more images of a real-world scene or other real-world object. Other embodiments may be configured to generate a digital three-dimensional representation of the real-world scene and/or retrieve a previously generated digital three-dimensional representation.

The present disclosure further relates to a computer program product comprising program code means adapted to cause, when executed on a data processing system, said data processing system to perform the steps of one or more of the methods described herein.

The computer program product may be provided as a computer-readable medium. Generally, examples of a computer-readable medium include a CD-ROM, DVD, optical disc, memory card, flash memory, magnetic storage device, floppy disk, hard disk, etc. In other embodiments, a computer program product may be provided as a downloadable software package, e.g. on a web server for download over the Internet or other computer or communication network, or an application for download to a mobile device from an App store.

Game Play Loop

According to a further aspect, the disclosure relates to a method of playing an interactive game including performing the above method for creating a virtual game environment/scene.

Preferably, the method of playing an interactive game is arranged in a cyclic manner, each cycle comprising the steps of
- Creating a virtual game environment/scene from a game enabled virtual toy construction model using a 3D-scan of selected physical objects as described herein;
- playing one or more game segments in the virtual game environment/scene; and
- in response to the outcome of the game play, initiating a new cycle.

According to some embodiments, the creation of the virtual game environment is a step separate from the actual virtual game play involving virtual objects moving about and/or otherwise interacting with the created virtual game environment. In particular, the user may use a previously created virtual environment to engage in virtual game play without the need of the physical model of the virtual environment still being present or still being targeted with a capture device. This is in contrast to some real-time systems which augment real-time images with computer generated graphics during the game play. At least in some embodiments of the present disclosure, the virtual game environment is solely represented by a computer-generated digital representation that may be stored on a data processing system for later use.

According to a further aspect, the disclosure relates to a cyclic interactive game system for playing an interactive game including a device adapted for performing the above method for creating a virtual game environment/scene as described with respect to the interactive game system mentioned above.

Preferably, the cyclic interactive game system is arranged and programmed for playing an interactive game in a cyclic manner, each cycle comprising the steps of Creating a virtual game environment/scene of a game enabled virtual toy construction model using a three-dimensional scan of selected physical objects as described herein;

playing one or more game segments in the virtual game environment/scene; and in response to the outcome of the game play, initiating a new cycle.

Advantageously, the outcome of the game play may be remunerated by an award directly, or indirectly, e.g. via in-game currency and/or user input, unlocking new game levels, new tools, new themes, new tasks, new playing and/or non-playing characters, new avatars, new skills, and/or new powers, or the like.

By a arranging the game play system/method in a cyclic manner, a continued and constantly evolving game play experience is provided, which is particularly interactive, and further stimulates the development of strategy skills, nurturing skills, conflict handling skills, exploration skills, and social skills.

Since physical objects in the user's physical environment are interlinked with the virtual world, the user experiences that changes and choices applied in the physical world matter in the virtual game play. Thereby the user's physical game play and the virtual game play are linked together in a continued and dynamically evolving manner.

Physical Playable Characters Made of Toy Construction Elements

According to a further advantageous embodiment, the interactive or cyclic interactive game system further includes a physical playable character provided as a toy construction model of the playing character, wherein the virtual game play is performed through a virtual playable character in the form of a virtual toy construction model representing the physical playing character in the virtual world. Advantageously, the physical playing character may be equipped with physical tool models representing specific tools, skills, and/or powers that are then unlocked and represented in a corresponding manner in the virtual playable character. Thereby the interactive experience of inter-linked physical and virtual game play experience is further enhanced.

The physical playable character may be entered and unlocked in the virtual game play by any suitable method, such as scanning and recognizing the physical playable character, e.g. as described herein. In some embodiments, the process may perform a look-up in a library of known/available/certified playable characters, and/or recognize and identify physical features and/or toy construction elements or known functionality that are present in the physical playable character, and construct a corresponding virtual playable character. Other ways of unlocking a virtual playable character and linking the virtual playable character to a corresponding physical playable character including toy construction elements representing tools/skills/powers available to the playable character may be conceived, such as scanning an identification tag, entering codes for identifying and/or unlocking the playable character and its tools/skills/powers in a user dialog interface, or the like.

BRIEF DESCRIPTION OF THE DRAWINGS

Preferred embodiments of the disclosure will be described in more detail in connection with the appended drawings.

DETAILED DESCRIPTION

Figure 1:
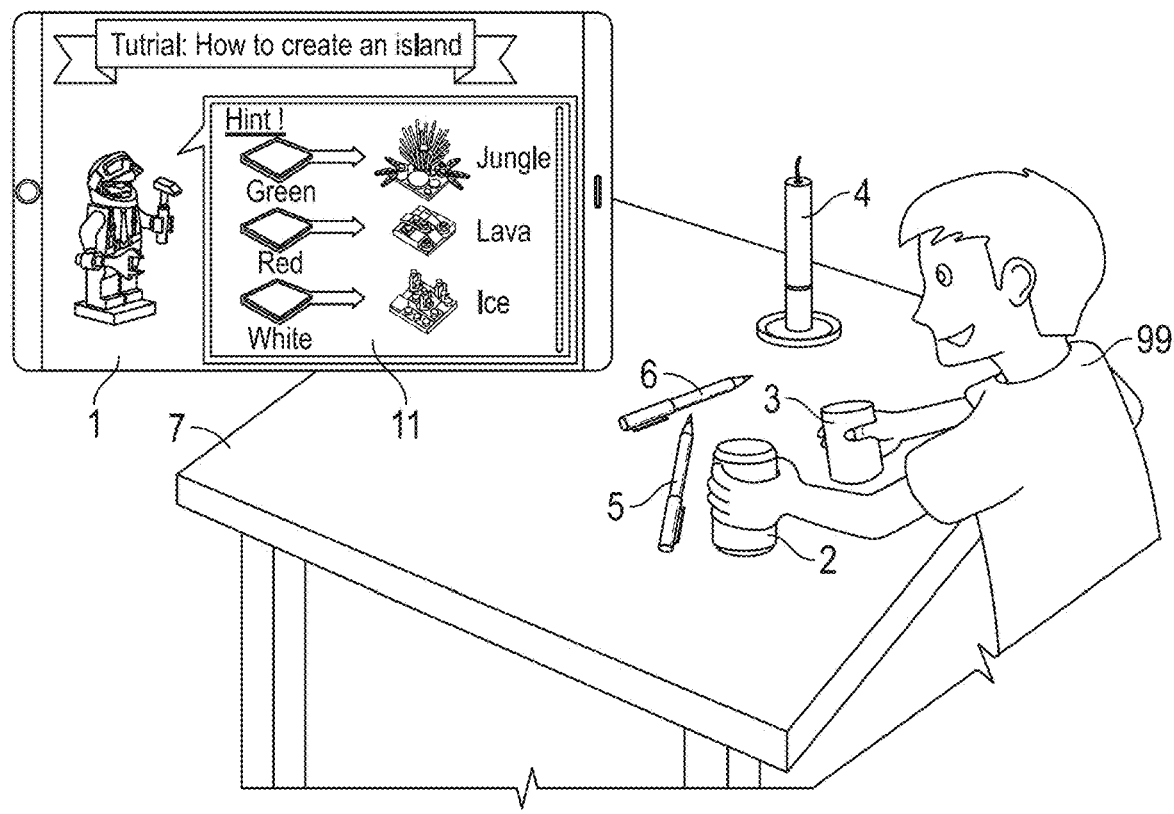
FIG. 1 shows the steps of creating a physical model according to one embodiment.

FIG. 1 shows steps of creating a physical model according to one embodiment. The virtual part of the game is played on a mobile device 1, such as a tablet computer, a portable computer, or the like. The mobile device 1 has a capturing device, data storage, a processor, and a display. It will be appreciated, however, that the various embodiments of the process described herein may also be implemented on other types of processing devices. The processing device may comprise a capturing device, data storage, a processor, and a display integrated into a single physical entity; alternatively, one or more of the above components may be provided as one or more separate physical entities that may be communicatively connectable with each other otherwise to allow data transfer between them. Game software installed on the mobile device 1 adapts the mobile device 1 for performing the method according to one embodiment of the disclosure within the framework of an interactive game. The mobile device 1 presents a building tutorial to the user 99. Following the instructions of the tutorial, the user 99 finds a number of physical objects 2, 3, 4, 5, 6 and arranges these physical objects 2, 3, 4, 5, 6 on a physical play zone 7, such as a table top or a floor space, to form a physical model 10 of a game environment. Advantageously, the building tutorial includes hints 11 on how certain pre-determined physical properties of physical objects in the physical model of the game environment will be translated by the game system into characteristics of the virtual game environment to be created. This allows the user 99 to select the physical objects 2, 3, 4, 5, 6 according to these pre-determined physical properties to wilfully/intentionally build the physical model in order to create certain predetermined characteristics/a certain game behaviour of the virtual game environment according to a pre-determined set of rules. By way of example, FIG. 1 shows a hint in the form of a translation table indicating how different values of a pre-determined physical property, here colour, are handled by the system. In particular, the user 99 is presented with the hint that green colours on physical objects will be used to define jungle elements, red colours will be used to define lava elements, and white colours will be used to define ice elements in the virtual game environment.

Figure 2:
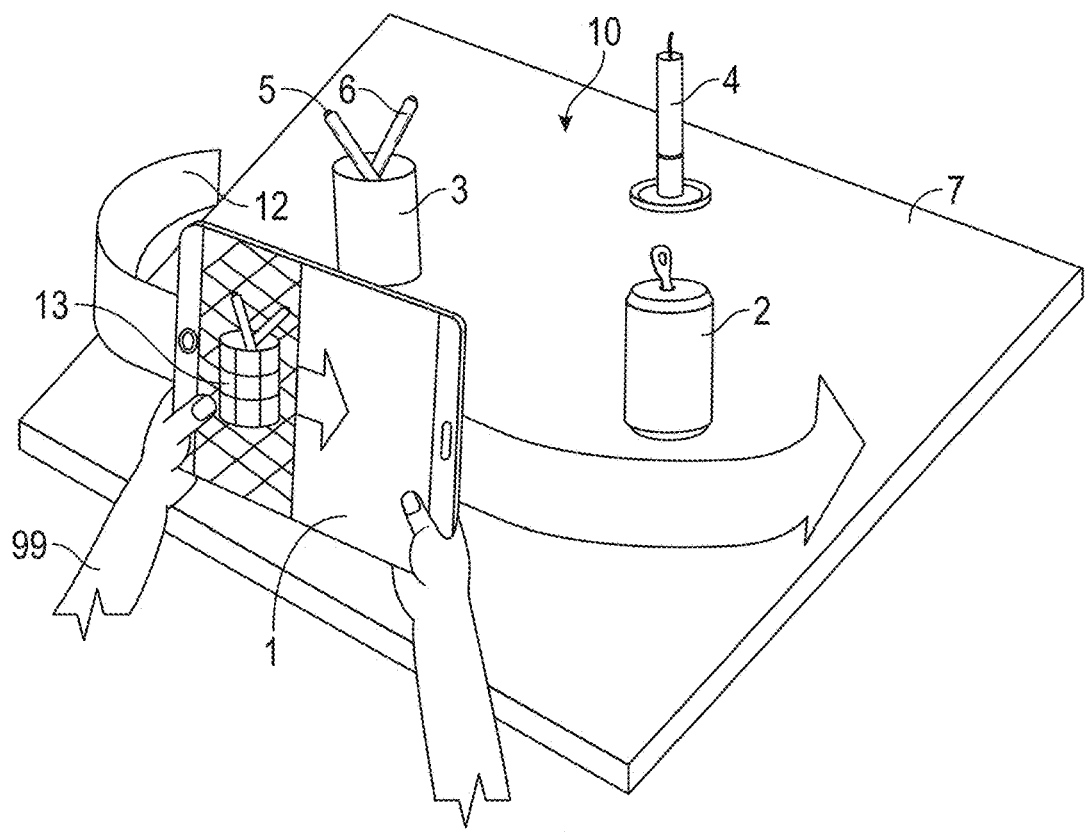
FIG. 2 shows the steps of creating a virtual model from the physical model created by the steps of FIG. 1.

FIG. 2 illustrates steps of creating a virtual model from the physical model 10 created by arranging physical objects 2, 3, 4, 5, 6 on a physical play zone 7. The mobile device 1 is moved along a scanning trajectory 12 while capturing image/scan data 13 of the physical model 10. The image data is processed by the processor of the mobile device 1 thereby generating a digital three-dimensional representation indicative of the physical model 10 as well as information on pre-determined physical properties, such as colour, shape and/or linear dimensions. The digital three-dimensional representation may be represented and stored in a suitable form in the mobile device, e.g. in a mesh form. The mesh data is then converted into a virtual toy construction model using a suitable algorithm, such as a mesh-to-LXFML code conversion algorithm as further detailed below. The algorithm analyses the mesh and calculates an approximated representation of the mesh as a virtual toy construction model made of virtual toy construction elements that are direct representations of corresponding physical toy construction elements.

Figure 3:
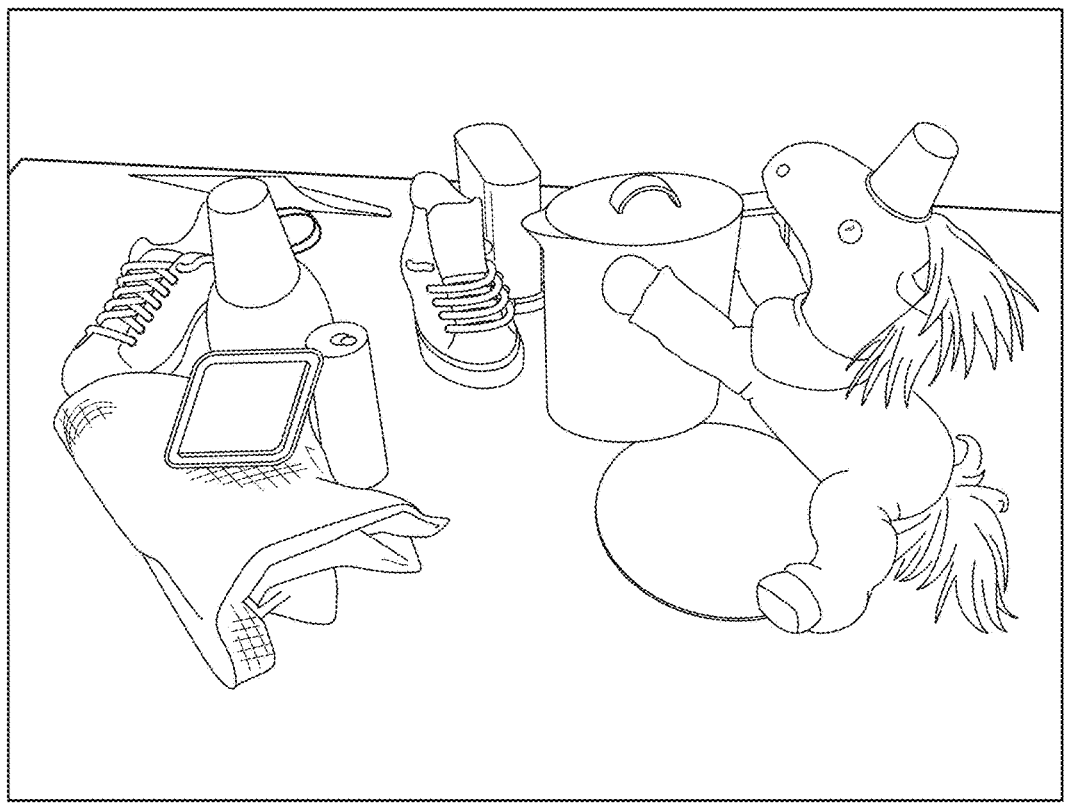
FIGS. 3-7 show the steps of creating a virtual game environment from a physical model according to a further embodiment.
Figure 4:
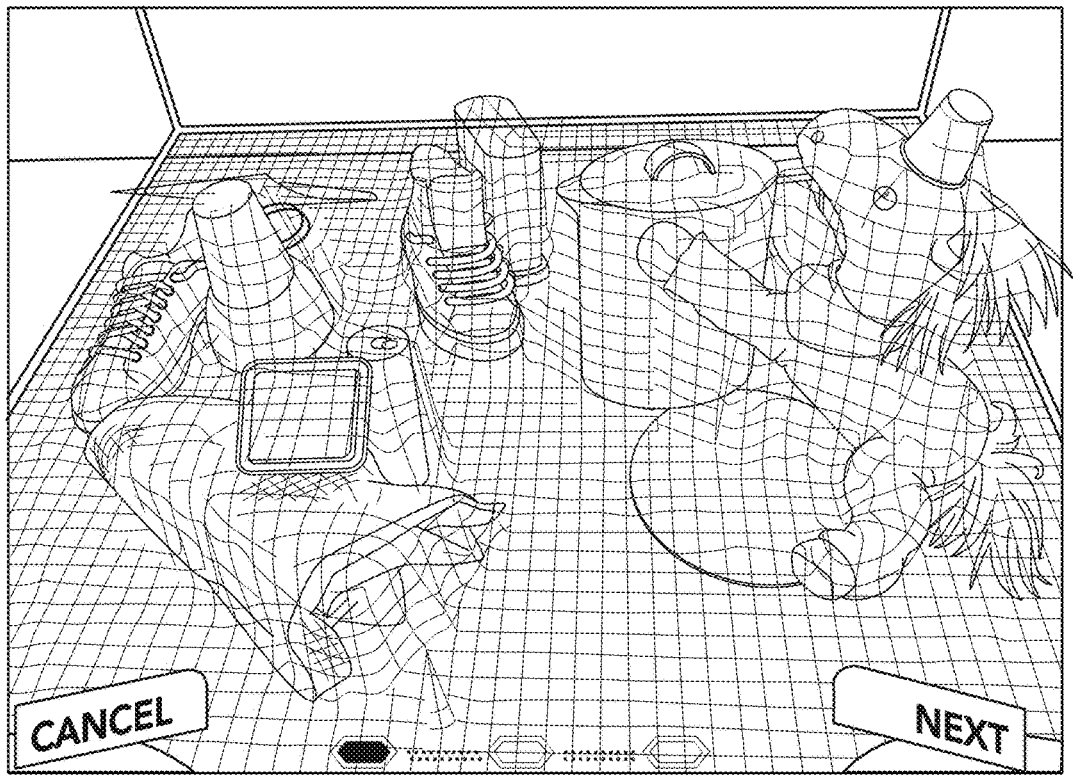
Figure 5:
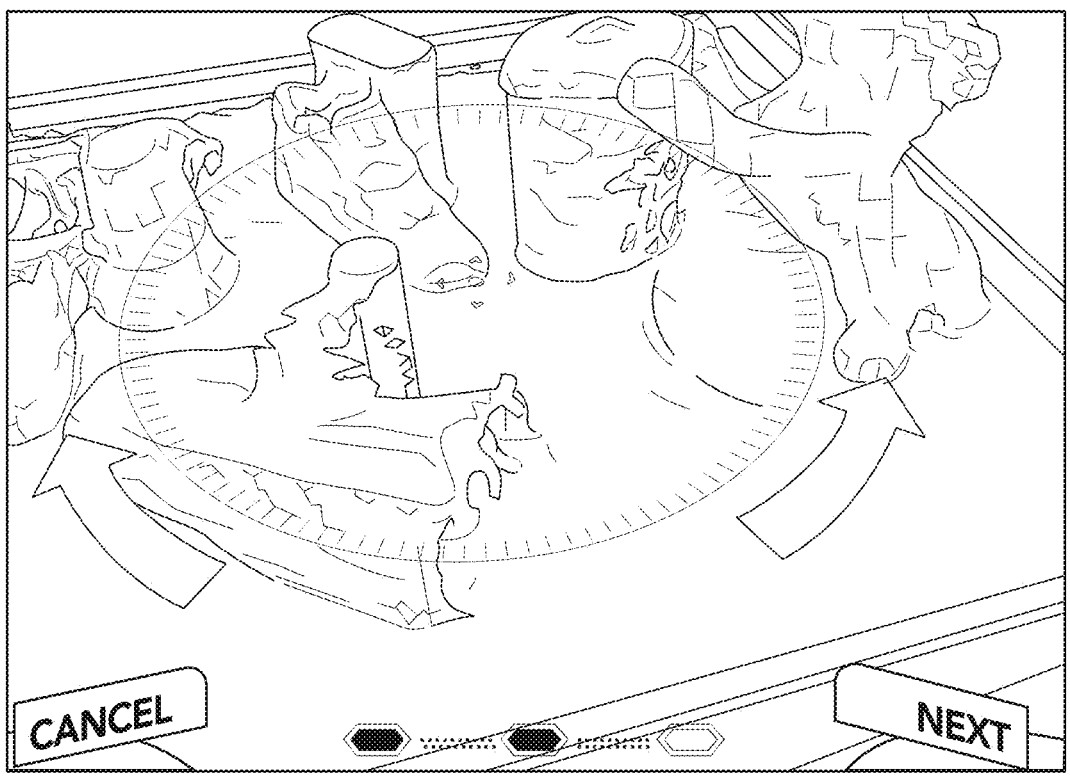
Figure 6:
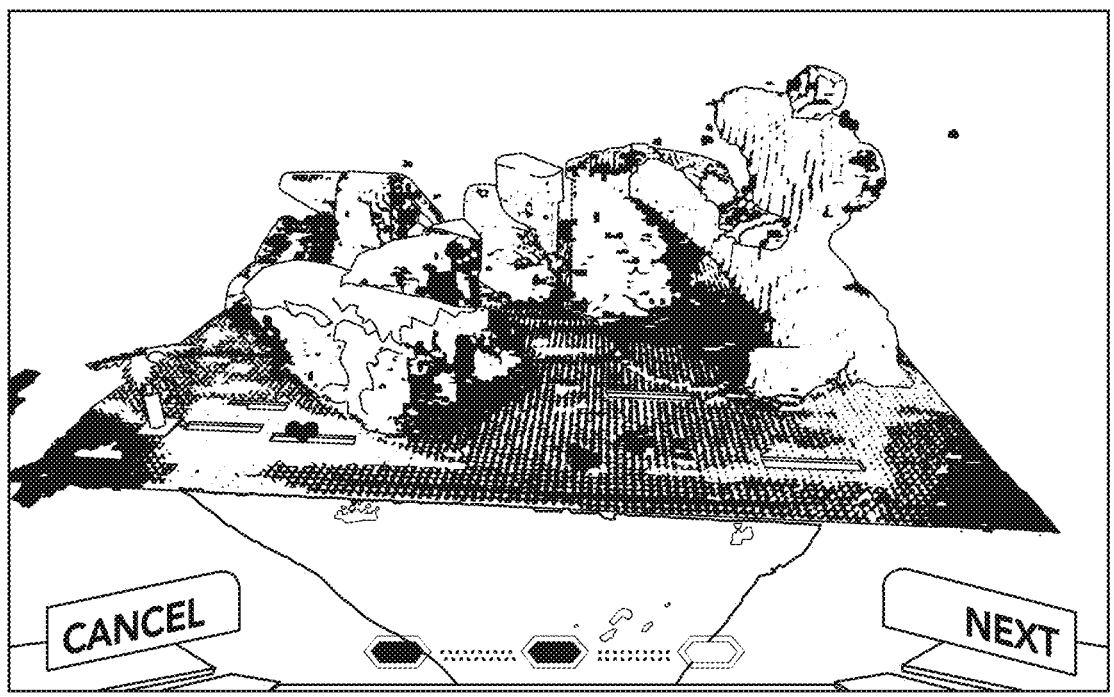
Figure 7:
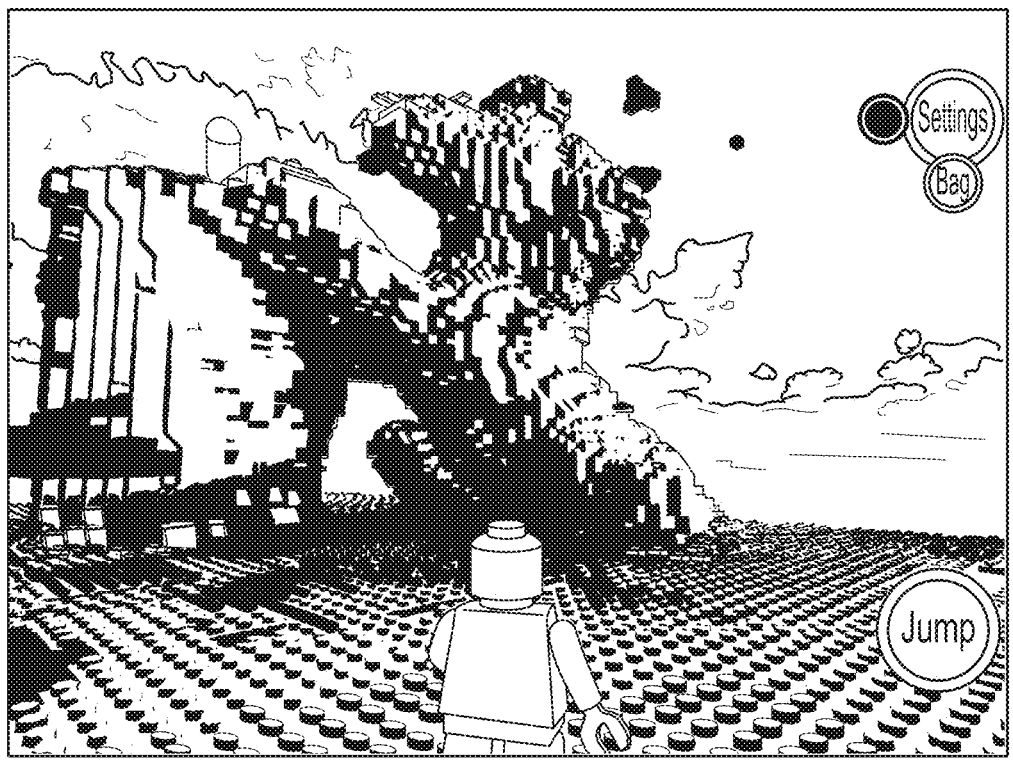

Referring to FIGS. 3-7, steps of creating a virtual game environment from a physical model according to a further embodiment are illustrated by means of screen shots from a mobile device used for performing the steps. FIG. 3 shows an image of a set-up of different everyday items found in a home and in a children's room as seen by a camera of the mobile device. These items are the physical objects used for building the physical model of the virtual game environment to be created by arranging the items on a table. The physical objects have different shapes, sizes and colours. The items include blue and yellow sneakers, a green lid for a plastic box, a green can, a folded green cloth, a yellow box, a red pitcher, a grey toy animal with a white tail, mane and forelock as well as a red cup placed as a fez hat, and further items. In FIG. 4 the physical model is targeted using an augmented reality grid overlaid to the view captured by the camera of the mobile device. The camera is a depth sensitive camera and allows for a scaled augmented reality grid to be shown. The augmented reality grid indicates the targeted area captured, which in the present case is a square of 1 m by 1 m. FIG. 5 shows a screen shot of the scanning process, where the mobile device with the camera pointed at the physical model is moved around, preferably capturing image data from all sides as indicated by the arrows and the angular scale. However, a partial scan may be sufficient depending on the nature of the three-dimensional image data required for a given virtual game environment to be created. FIG. 6 shows a screen shot after a brickification engine has converted the three-dimensional scan data into a virtual toy construction model made to scale from virtual toy construction elements. The virtual toy construction model also retains information about different colours in the physical model. In FIG. 7 the virtual toy construction model has been enhanced by defining game controlling elements into the scene, thereby creating a virtual game environment where essentially everything appears to be made of virtual toy construction elements. FIG. 7 shows a screen shot of a playable figure exploring the virtual game environment. The playable figure is indicated in the foreground as a colourless/white, three-dimensional virtual mini-figure. Buttons on the right hand edge of the screen are user interface elements for the game play.

Figure 8:
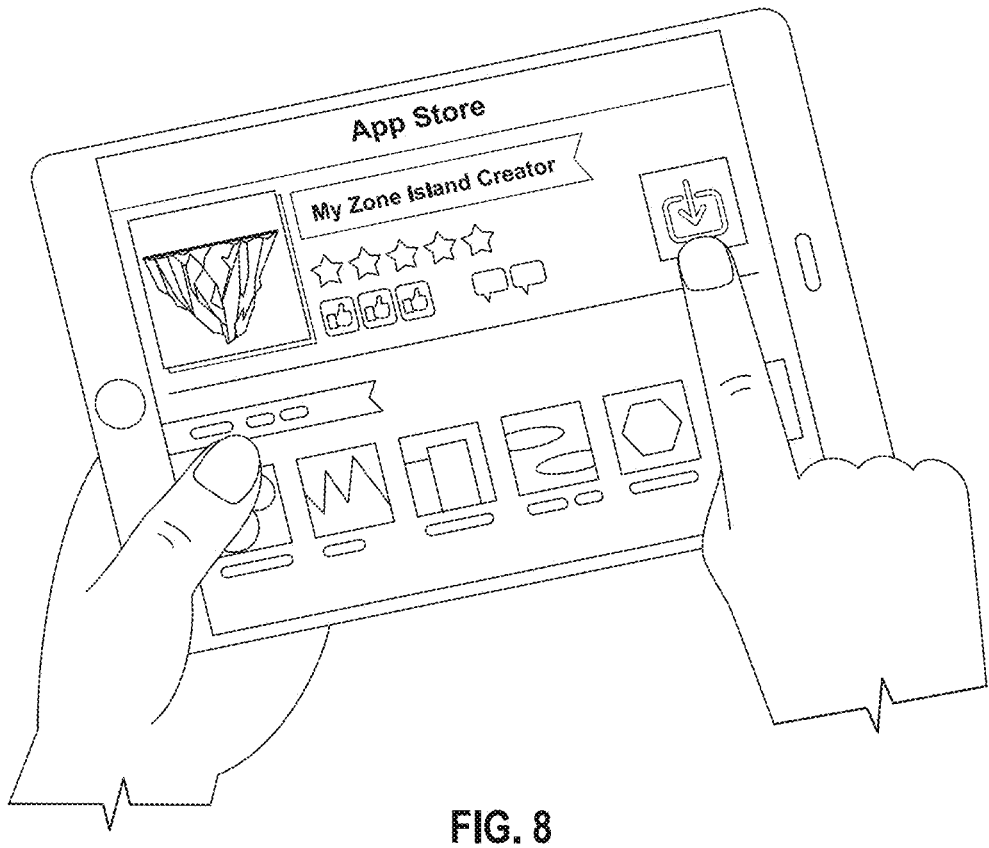
FIGS. 8-17 show the steps of installing and playing a cyclic interactive game according to a yet further embodiment.
Figure 9:
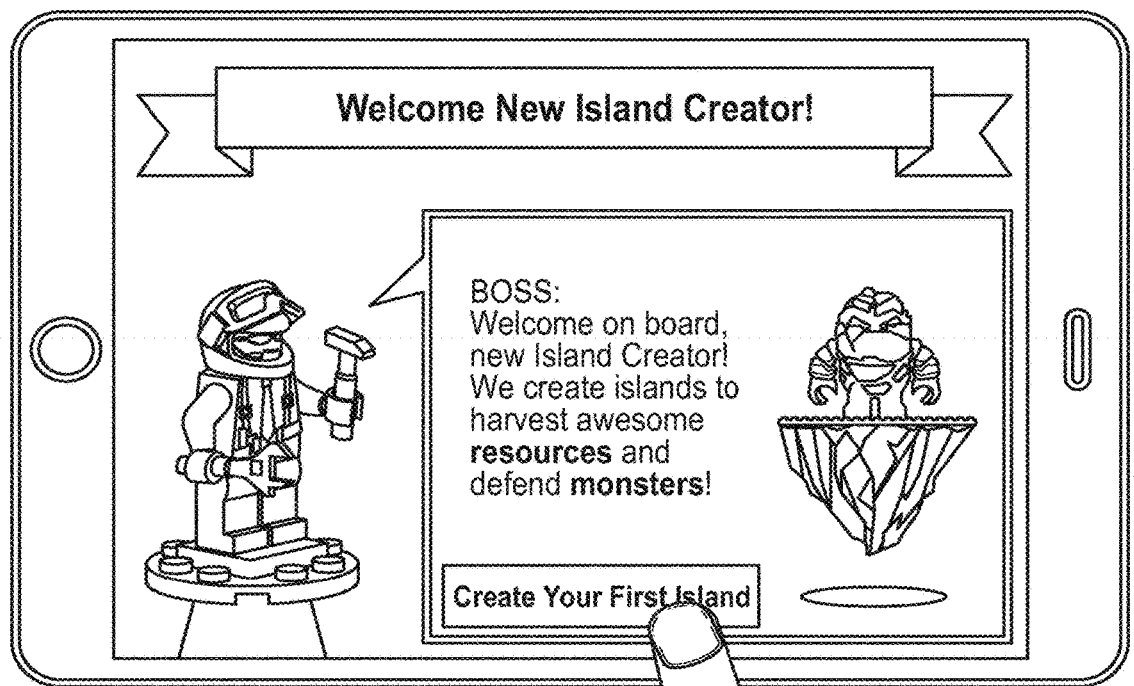
Figure 10:
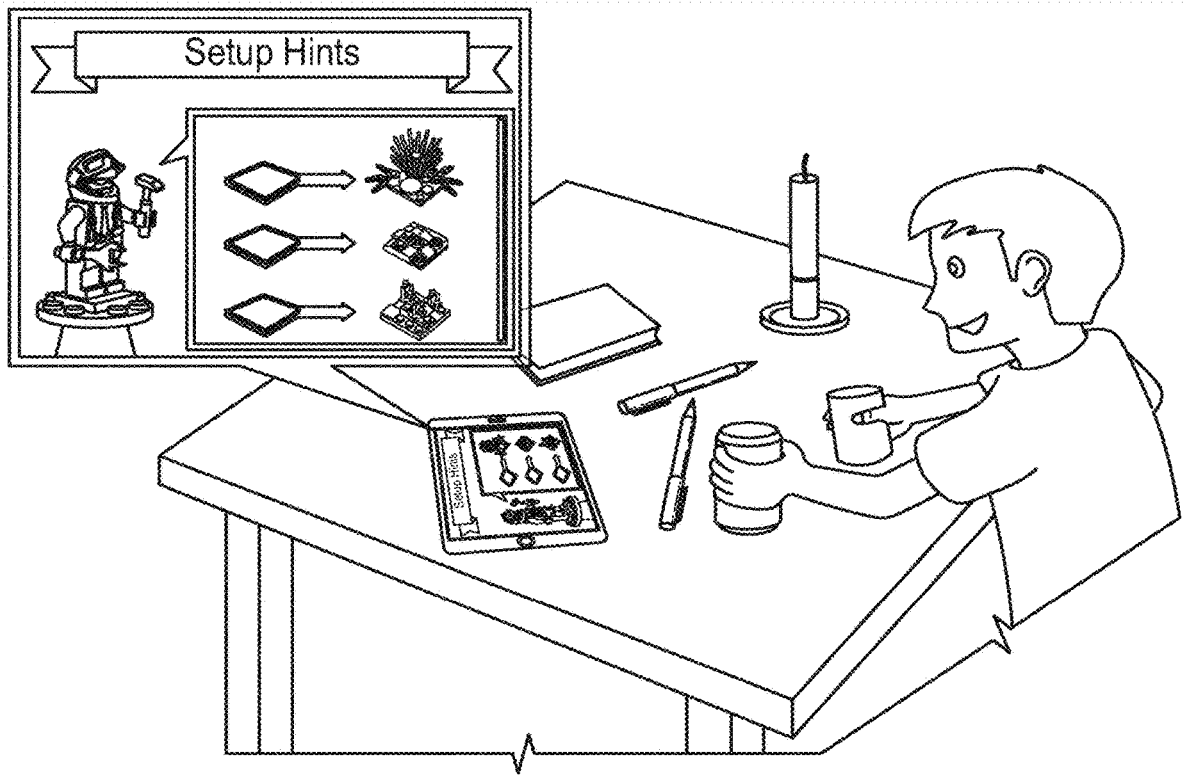
Figure 11:
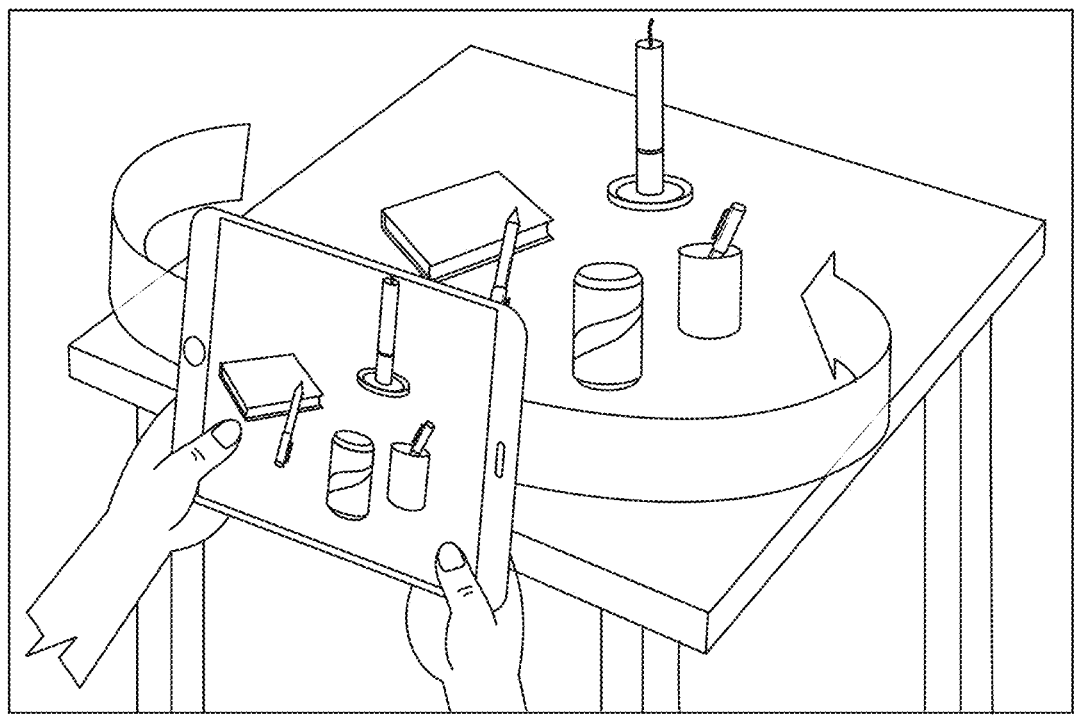
Figure 12:
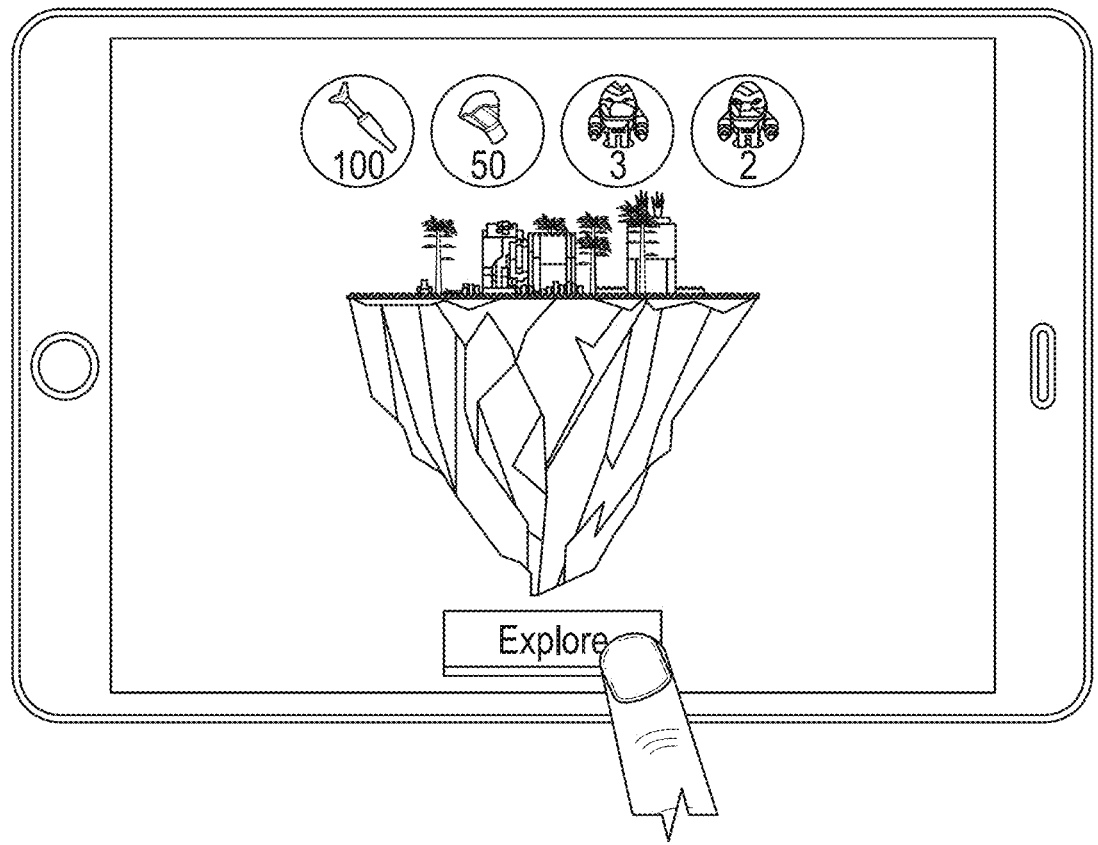
Figure 13:
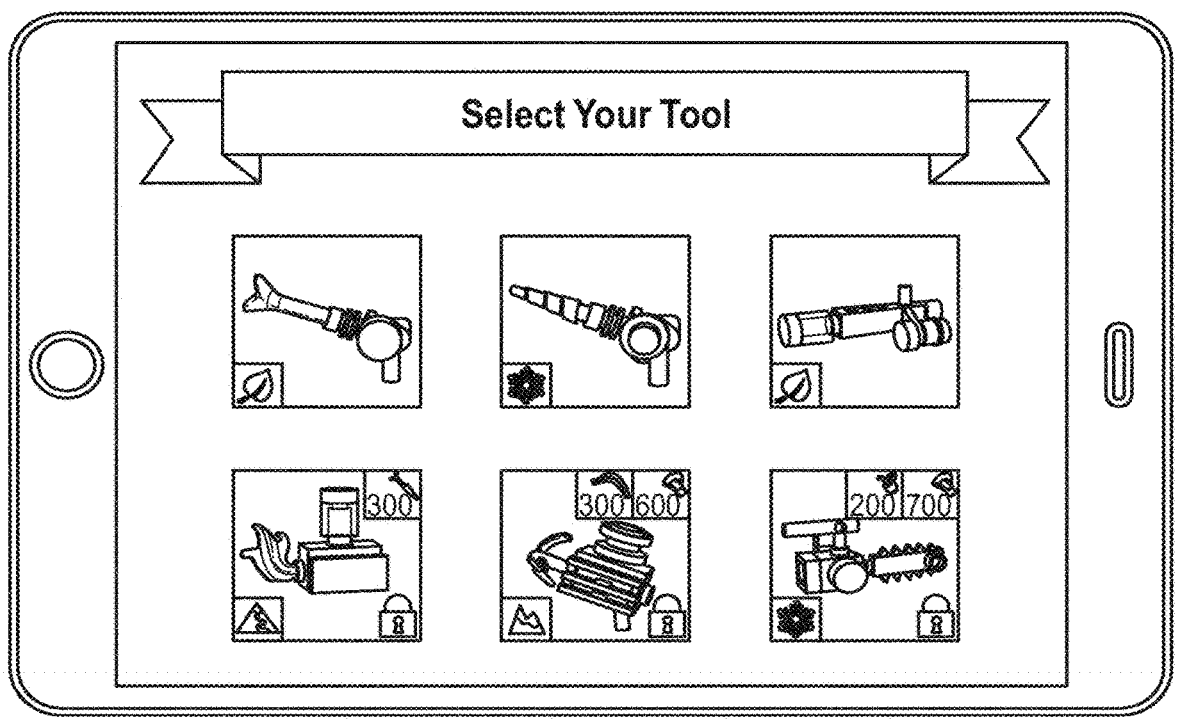
Figure 14:
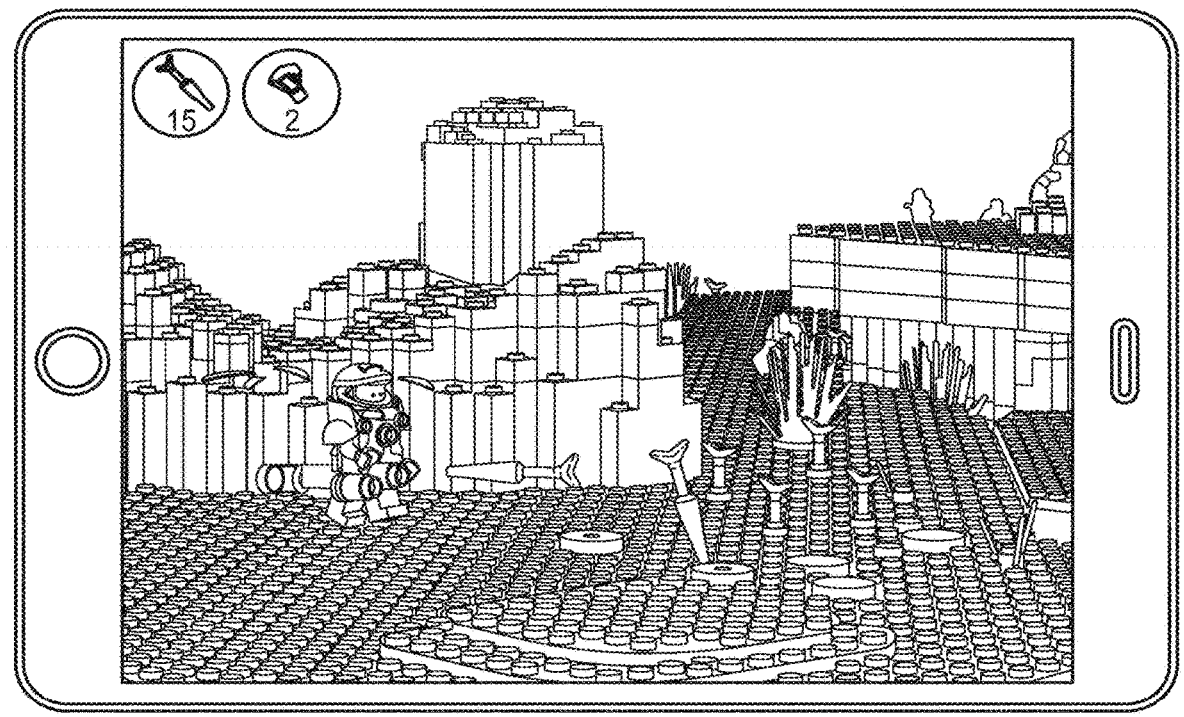
Figure 15:
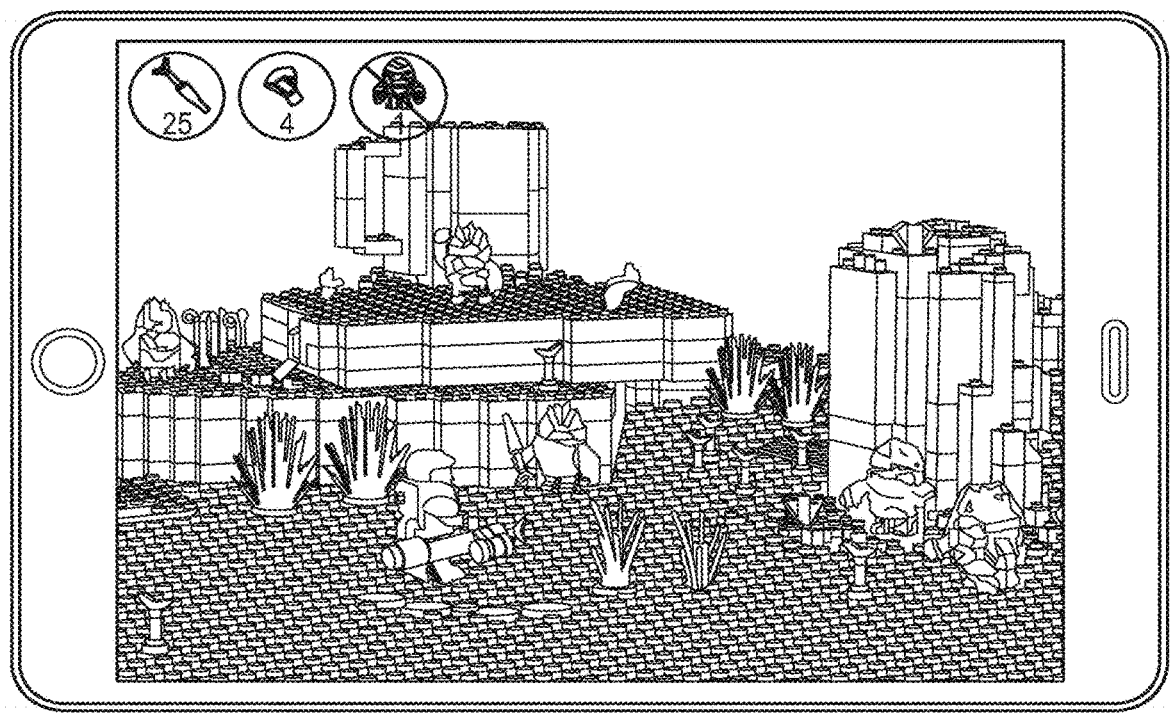
Figure 16:
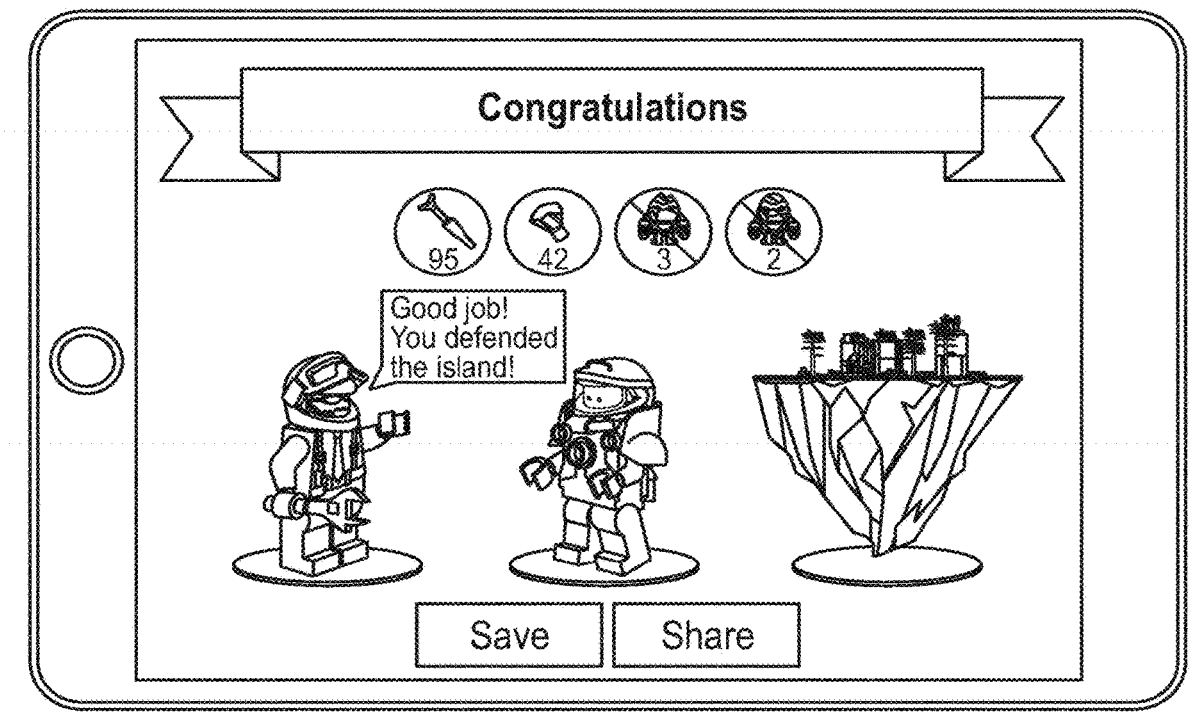
Figure 17:
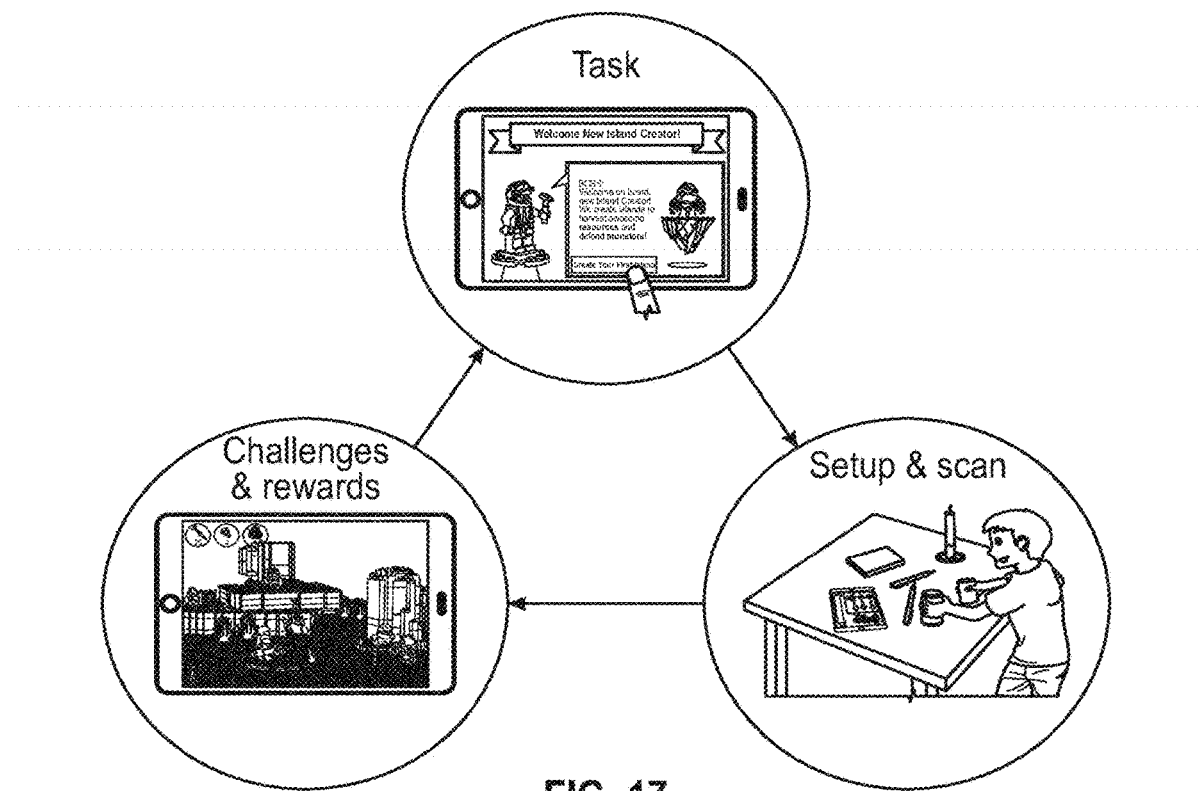

Now referring to FIGS. 8-17, steps of installing and playing a cyclic interactive game according to a yet further embodiment are illustrated schematically. In FIG. 8, the software required for configuring and operating a mobile device for its use in an interactive game system according to the present disclosure is downloaded and installed. Upon start-up of the game software a welcome page may be presented to the user as seen in FIG. 9, from which the user enters a building mode. The user may now be presented with a building tutorial and proceed to building a physical model and creating a virtual game environment as indicated in FIGS. 10 and 11, and as already described above with reference to FIGS. 1 and 2. The physical objects used for constructing the physical model are grey pencils, a brown book, a white candle standing upright in a brown foot, a white cup (in the right hand of the user in FIG. 10) and a red soda can (in the left hand of the user on FIG. 10). Once the virtual game environment is created, the user may proceed to game play by exploring the virtual game environment created as seen in FIG. 12. Before embarking on a virtual mission in the virtual game environment, the user may make a number of choices as, such as selecting a playable character and/or tools from a number of unlocked choices (top row in FIG. 13). A number of locked choices may also be shown (bottom row in FIG. 13). FIGS. 14 and 15 show different screenshots of a playable character on different missions (grey figure with blue helmet). The playable character is equipped with a tool for harvesting resources (carrots). In FIG. 14, the playable character is merely on a collecting mission. Seen in the background of the screenshot of FIG. 14 is a lava-mountain created from the red soda can in the physical model. The same virtual game environment created from the same physical model is also shown in FIG. 15, but from a different angle and at a different point in the course of the game. The lava-mountain created from the red soda can is shown in the landscape on the right hand side. The white cup of the physical model has been turned into an iceberg surrounded in its vicinity by ice and snow. The game environment has now spawned monsters/adversaries that compete with the playable figure for the resources to be collected (e.g. carrots and minerals), and which may have to be defeated as a part of a mission. In FIG. 16, the user has successfully completed a mission and is rewarded, e.g. by an amount of in-game currency. The in-game currency can then be used to unlock new game features, such as tools/powers/new playable characters/game levels/modes or the like. After reward and unlocking of game features, the user may receive a new mission involving a rearrangement of the physical model, thereby initiating a new cycle of the interactive game. The cycle of a cyclic interactive game is shown schematically in FIG. 17. The game system provides a task (top) and the user creates a virtual game environment/scene from physical objects (bottom right); the user plays one or more game segments in the virtual game environment/scene (bottom left); and in response to the outcome of the game play, a new cycle is initiated by the game system (back to the top).

Figure 18:
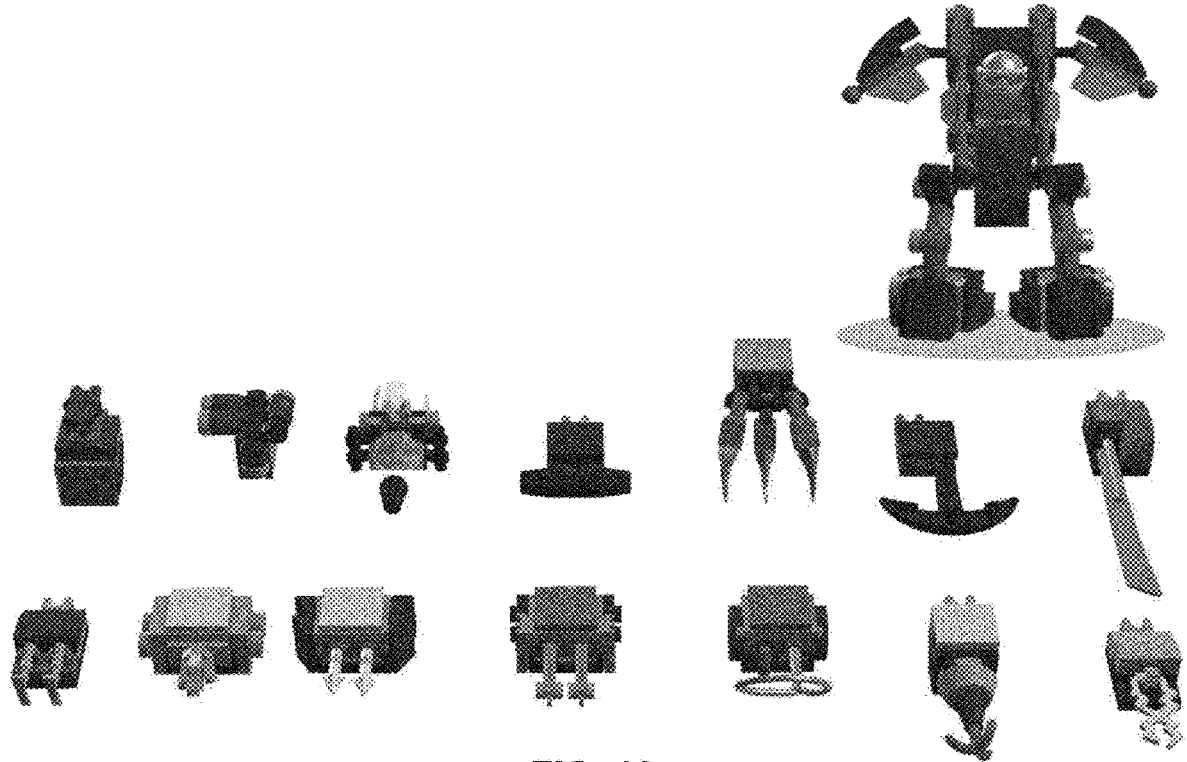
FIG. 18 is a physical playable character model with different physical tool models.
Figure 19:
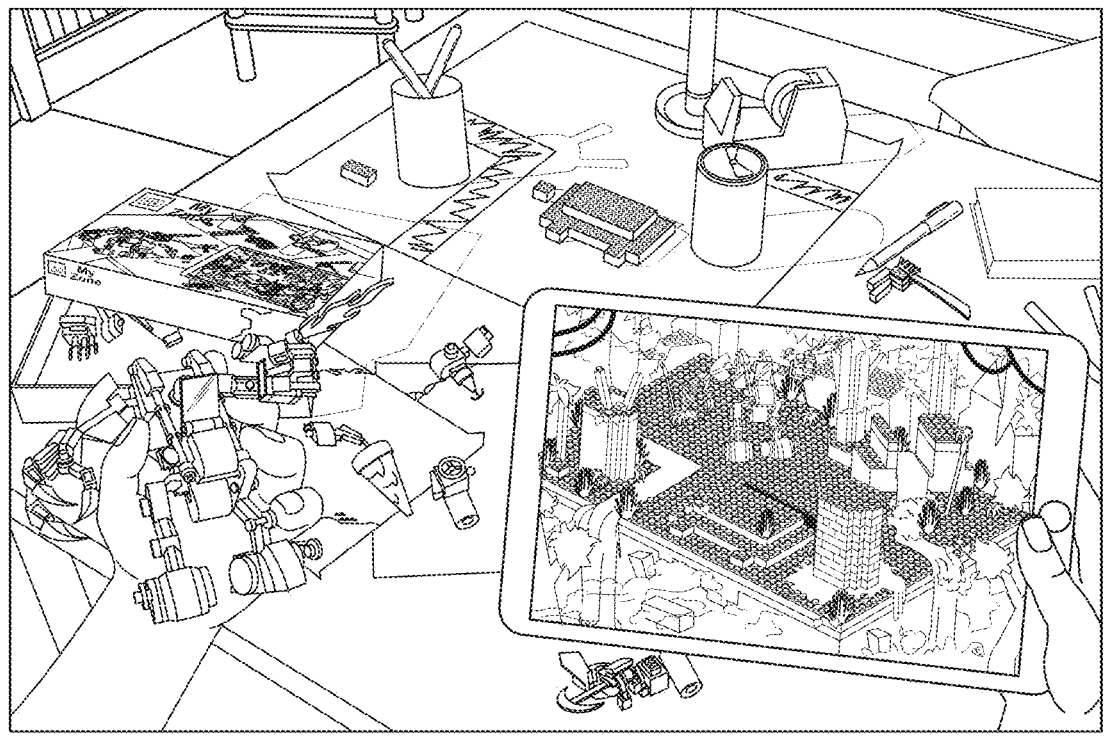
FIG. 19 is an interactive game system including a physical playable character model.

FIG. 18 shows an example of a physical playable character model with different physical tool models. The physical playable character model is for use in an interactive game system. The playable character model may be fitted with a choice of the physical tool models. By way of example, a selection of physical tool models is shown in the bottom half of FIG. 18. Each physical tool model represents specific tools, powers and/or skills. FIG. 19 shows an interactive game system including the physical playable character model of FIG. 18. The physical playable character model may be used for playing, e.g. role playing, in the physical model created by means of the physical objects as shown in the background. By entering information about the physical playable character model and the tools with which it is equipped in the game, a corresponding virtual playable character model is created for game play in the virtual game environment as indicated on the display of the handheld mobile device in the foreground of FIG. 19 (bottom right). Note also, that on the schematic view a physical play zone has been defined by a piece of green card board on the table top. The green card board has been decorated with colour pencils to mark areas on the physical play zone that in the virtual game environment are converted into rivers with waterfalls over the edge of the virtual scene as shown schematically on the handheld mobile device in the foreground.

An important step in creating the virtual game environment is the conversion of the digital three-dimensional representation obtained from, or at least created on the basis of data received from, the capturing device into a virtual toy construction model constructed from virtual toy construction elements or into another voxel-based representation. In the following an example will be described of a conversion engine adapted for performing such a conversion, in particular a conversion engine for conversion from a mesh representation into an LXFML representation. It will be appreciated that other examples of a conversion engine may perform a conversion into another type of representation.

With the evolution of computers and computer vision it is becoming easier for computers to analyze and represent 3D objects in a virtual world. Different technologies exist nowadays that facilitate the interpretation of the environment, creating 3D meshes out of normal pictures obtained from normal cameras or out of depth camera information.

This means that computers, smartphones, tablets and other devices will increasingly be able to represent real objects inside an animated world as 3D meshes. In order to provide an immersive game experience or other types of virtual game experiences, it would be of great value if whatever a computer could "see" and represent as a mesh could then be transformed into a model built out of toy construction elements such as those available under the name LEGO or at least as a voxel-based representation.

Virtual toy construction models may be represented in a digital representation identifying which virtual toy construction elements are comprised in the model, their respective positions and orientations and, optionally, how they are interconnected with each other. For example, the so-called LXFML format is a digital representation suitable for describing models constructed from virtual counterparts of construction elements available under the name. It is thus desirable to provide an efficient process for converting a digital mesh representation into a LEGO model in LXFML format or into a virtual construction model represented in another suitable digital representation.

Usually, 3D models are represented as meshes. These meshes are typically collections of colored triangles defined by the corners of the triangles (also referred to as vertices) and an order of how these corners should be grouped to form these triangles (triangle indexes). There is other information that a mesh could store but the only other thing relevant for this algorithm is the mesh color.

As described earlier, the algorithm receives, as an input, mesh information representing one or more objects. The mesh information comprises:

Mesh vertices/vertex positions: the coordinates of the points that form the triangles, meaning points in space, e.g. represented as vectors (x,y,z), where x,y,z can be any real number.

Figure 20:
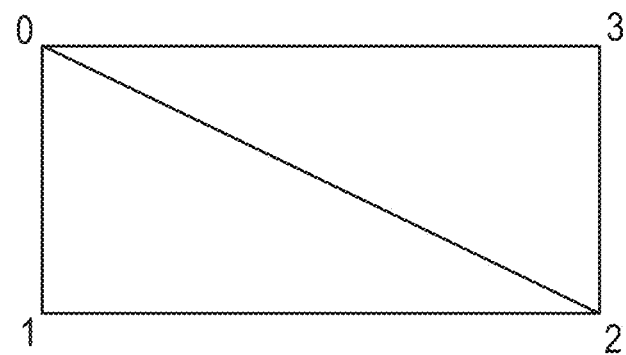
FIG. 20 is an example of a triangle indexing scheme in a mesh.

Triangle indexes: the indexes of the vertices in consecutive order so that they form triangles, i.e. the order in which to choose the vertices from the positions in order to draw the triangles in the mesh. For example, FIG. 20 illustrates an example of an indexing scheme for a simple surface defined by 4 points labelled 0, 1, 2 and 3, respectively, defining a rectangle. In this example, an array of indexes like {0,1,2,3,0} may be defined to represent how triangles may be defined to represent the surface. This means that a process starts from point 0, proceed to point 1, then to point 2. That is the first triangle. The process may then proceed from the current point (point 2) to define the next triangle, so the process only needs the remaining 2 points, which are 3 and 0. This is done in order to use less data to represent the triangles.

Mesh color information: the colors that the triangles have.

Embodiments of the process create a representation of a virtual construction model, e.g. an LXFML string format version 5 or above. The LXFML representation needs to include the minimum information that would be needed by other software tools in order to load the information inside. The following example will be used to explain an example of the information included n an LXFML file:

```
1    <?xml version="1.0" encoding="UTF-8" standalone="no" ?>
2    <LXFML versionMajor="5" versionMinor="0" name="Untitled">
3    <Meta>
```

```
    4      <Application name="VoxelBrickExporter" versionMajor="0" ver-
sionMinor="1"/>
    5    </Meta>
    6    <Bricks>
    7      <Brick refID="0" designID="3622">
    8        <Part refID="0" designID="3622" materials="316">
    9          <Bone refID="0"
transformation="5.960464E-08,0,0.9999999,0,1,0,-0.9999999,0,5.960464E-
08,0,1.6,20">
   10          </Bone>
   11        </Part>
   12      </Brick>
   13    </Bricks>
   14  </LXFML>
```

The first line merely states the format of the file.

The second line contains information about the LXFML version and the model name. The LXFML version should preferably be 5 or higher. The model name serves as information only. It does not affect the loading/saving process in any way.

A <Meta> section is where optional information is stored. Different applications can store different information in this section if they need to. The information stored here does not affect the loading process.

Line 4 provides optional information about what application exported the LXFML file. This may be useful for debugging purposes.

The subsequent lines include the information about the actual toy construction elements (also referred to as bricks). The refID should be different for every brick of the model (a number that is incremented every time a brick is exported will do just fine). The design ID gives information about the geometry of the brick and the materials give information about the color. The transformation is the position and rotation of the brick represented by a 4 by 4 matrix but missing the $3^{rd}$ column.

This information is considered sufficient. One could test the validity of an LXFML file by loading it with the free tool LEGO Digital Designer that can be found at http://ldd.lego.com.

Figure 21:
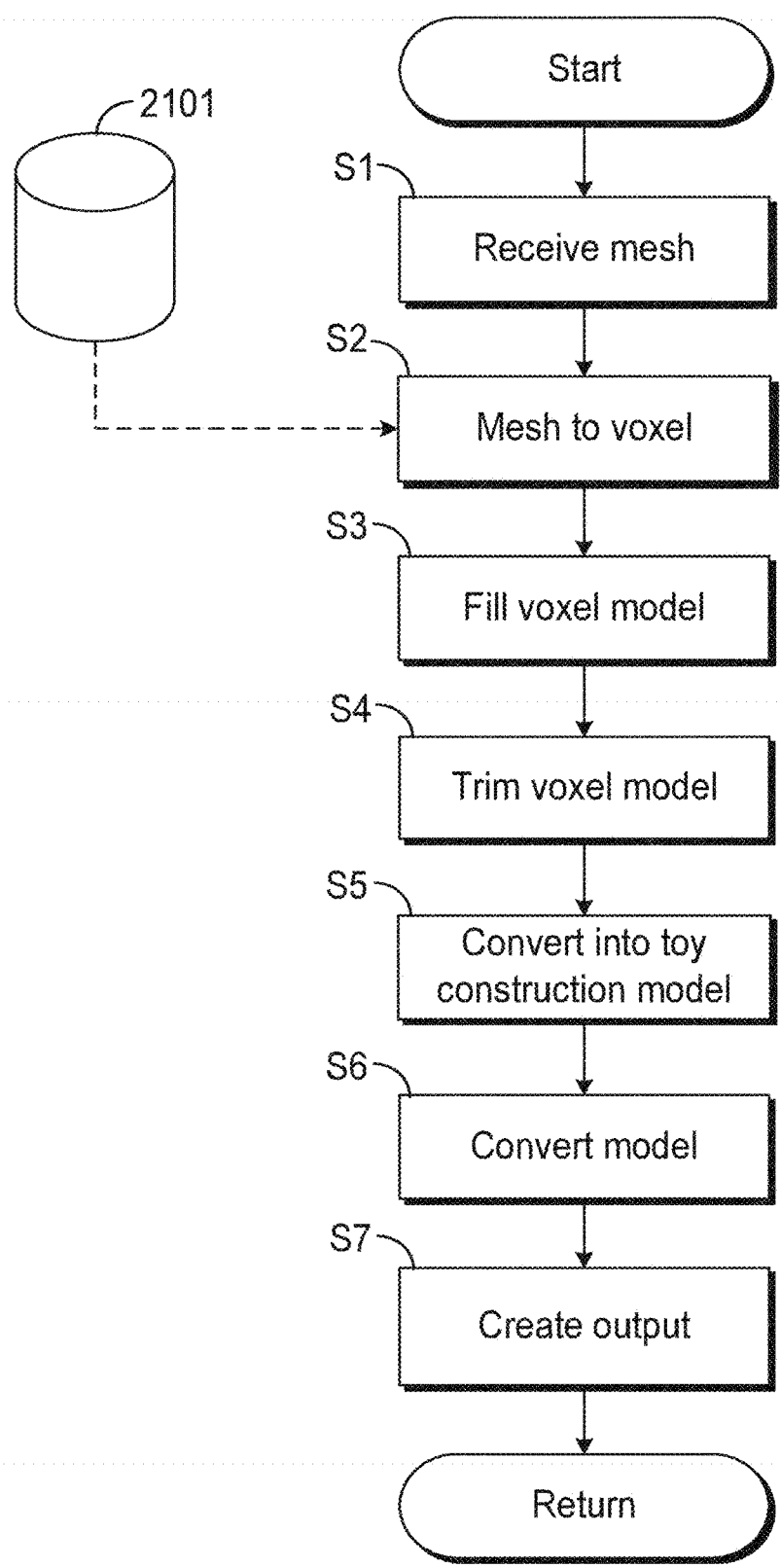
FIG. 21 is an example of a process for creating a virtual environment.

FIG. 21 shows a flow diagram illustrating the steps of an example of a process for converting a mesh into a representation of a virtual toy construction model. These steps are made independent because sometimes not all of them are used, depending on the situation.

In initial step S1, the process receives a mesh representation of one or more objects. For the purpose of the present description, it will be assumed that the process receives a mesh including the following information:

Vm=mesh vertices.
Tm=mesh triangles.
Cm=mesh color; (Per vertex color)

It will be appreciated that, instead of a mesh color, the mesh may represent another suitable attribute, such as a material or the like. Nevertheless, for simplicity of the following description, reference will be made to colors.

In an initial conversion step S2, the process converts the mesh into voxel space. The task addressed by this sub-process may be regarded as the assignment of colors (in this example colors from a limited palette 2101 of available colors, i.e. colors from a finite, discrete set of colors) to the voxels of a voxel space based on a colored mesh. The mesh should fit the voxel space and the shell that is represented by the mesh should intersect different voxels. The intersecting voxels should be assigned the closest color from the palette that corresponds to the local mesh color. As this technology is used in computer-implemented applications such as gaming, performance is very important.

The initial sub-process receives as an input a mesh that has color information per vertex associated with it. It will be appreciated that color may be represented in different ways, e.g. as material definitions attached to the mesh. Colors or materials may be defined in a suitable software engine for 3D modelling, e.g. the system available under the name "Unity".

The mesh-to-voxel conversion process outputs a suitable representation of a voxel space, e.g. as a 3-dimensional array of integer numbers, where each element of the array represents a voxel and where the numbers represent the color ID, material ID or other suitable attribute to be assigned to the respective voxels. All the numbers should be 0 (or another suitable default value) if the voxel should not be considered an intersection; otherwise, the number should represent a valid color (or other attribute) ID from the predetermined color/material palette, if a triangle intersects the voxel space at the corresponding voxel. The valid color should preferably be the closest color from the predetermined palette to the one the triangle intersecting the voxel has.

Figure 22A:
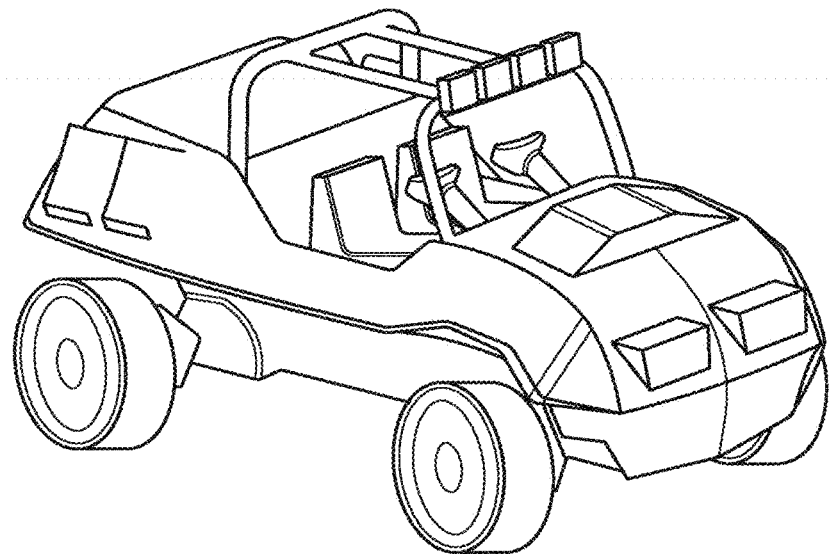
FIG. 22A is an example of a mesh representation of a virtual object.
Figure 22B:
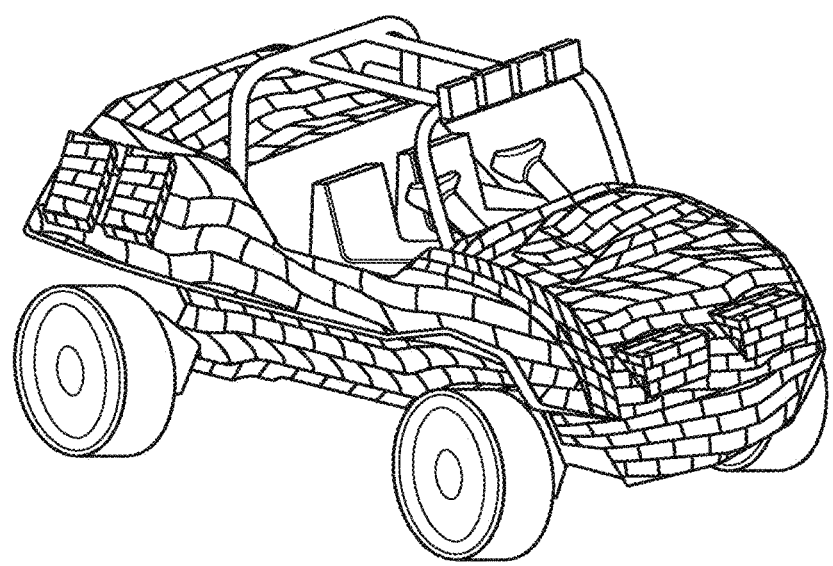
FIG. 22B is an example of a voxel representation of the virtual object of FIG. 22A.
Figure 23:
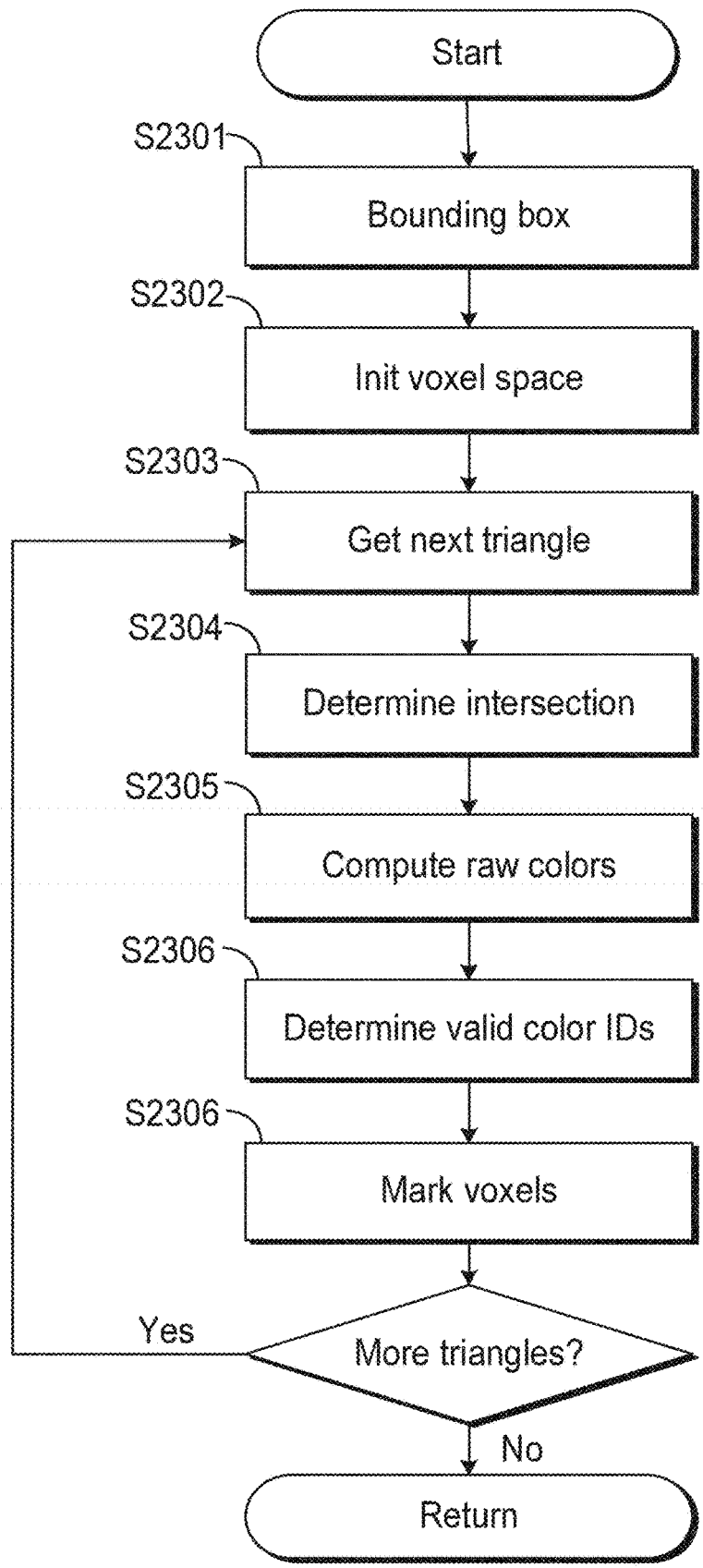
FIG. 23 is an example of a process for converting a mesh into a voxel representation.

FIG. 22A shows an example of a mesh representation of an object while FIG. 22B shows an example of a voxel representation of the same object where the voxel representation has been obtained by an example of the process described in the following with reference to FIG. 23.

So the task to be performed by the initial sub-process may be regarded as: given a mesh model, determine a voxel representation that encapsulates the mesh model and has as voxel color the closest one of a predetermined set of discrete colors to the mesh intersecting the voxel(s).

Initially converting the mesh into a voxel representation is useful as it subsequently facilitates the calculation of where different toy construction elements should be positioned. Voxels may be considered boxes of size X by Y by Z (although other types of voxels may be used). Voxels may be interpreted as 3D pixels. The conversion into voxels may be useful in many situations, e.g. when the model is to be represented as virtual toy construction elements in the form of box-shaped bricks of size X' by Y' by Z'. This means that any of the bricks that we might have in the model will take up space equal to a muitiple of X, Y, Z by the world axis x, y and z.

In order to create the voxel space needed for the model that is to be converted, the process starts at step S2301 by creating an axis-aligned bounding box around the model. The bounds can be computed from the mesh information. This can be done in many ways; for example the Unity system provides a way to calculate bounds for meshes.

Alternatively, a bound can be created out of two points: one containing the minimum coordinates by x, y and z of all the vertices in all the meshes and the other containing the maximum values by x, y and z, like in the following example:

$Pmin_x=Min_x(Vm1_x, Vm2_x ...)$
$Pmax_x=Max_x(Vm1_x, Vm2_x ...)$
$Pmin_y=Min_y(Vm1_y, Vm2_y ...)$
$Pmax_y=Max_y(Vm1_y, Vm2_y ...)$
$Pmin_z=Min_z(Vm1_z, Vm2_z ...)$
$Pmax_z=Max_z(Vm1_z, Vm2_z ...)$
$Pmin=(Pmin_x, Pmin_y, Pmin_z)$
$Pmax=(Pmax_x, Pmax_y, Pmax_z)$ Pmin and Pmax are the minimum and maximum points with coordinates x, y and z. Max and Min are the functions that get the minimum and maximum values from an array of vectors Vm by a specific axis (x,y or z).

Having the opposite corners of a box should be sufficient to define it. The box will have the size B=(bx, by, bz) by axis x, y and z. This means that B=Pmax−Pmin;

In a subsequent step S2302, the process divides the voxel space into voxels of a suitable size, e.g. a size (dimx, dimy, dimz) matching the smallest virtual toy construction element of a system of virtual toy construction elements. Preferably the remaining virtual toy construction elements have dimensions corresponding to integer multiples of the dimensions of the smallest virtual toy construction element. In one example, a voxel has dimensions (dimx, dimy, dimz)=(0.8, 0.32, 0.8) by (x,y,z) which is the size of a 1×1 Plate LEGO plate (LEGO Design ID: 3024). By creating the Voxel Space corresponding to the bounding box we will create a Matrix of size V(vx,vy,vz), where vx=bx/dimx+1, vy=by/dimy+1 and vz=bz/dimz+1. The +1 appears because the division will almost never be exact and any remainder would result in the need of having another voxel that will need filling.

The matrix will contain suitable color IDs or other attribute IDs. This means that a voxel will start with a default value of 0 meaning that in that space there is no color. As soon as that voxel needs to be colored, that specific color ID is stored into the array. In order to process the mesh, the process processes one triangle at a time and determines the voxel colors accordingly, e.g. by performing the following steps:

Step S2303: Get next triangle
Step S2304: Get the intersection of the triangle with the voxel space
Step S2305: Compute a raw voxel color of the intersecting voxel(s).
S2306: Get the color ID of the closest color from the raw voxel color and so the subsequent bricks can be created with a valid color.
Step S2307: Mark the voxel(s) with the determined color ID.

These steps are repeated until all triangles are processed.

The computation of the raw voxel color to be assigned to the intersecting voxels (Step S2305) may be performed in different ways. Given the input, the color of a voxel can be calculated based on the intersection with the voxel and the point/area of the triangle that intersects with the voxel or, in case of triangles that are small and the color variation is not that big, it could be assumed that the triangle has the same color and that is the average of the 3 colors in the corners. Moreover, it is computationally very cheap to calculate the average triangle color and approximate just that one color to one of the set of target colors. Accordingly:

In one embodiment, the process may simply average out the color of the triangle using the 3 vertex colors and then use the average color for all intersections.

Figure 24:
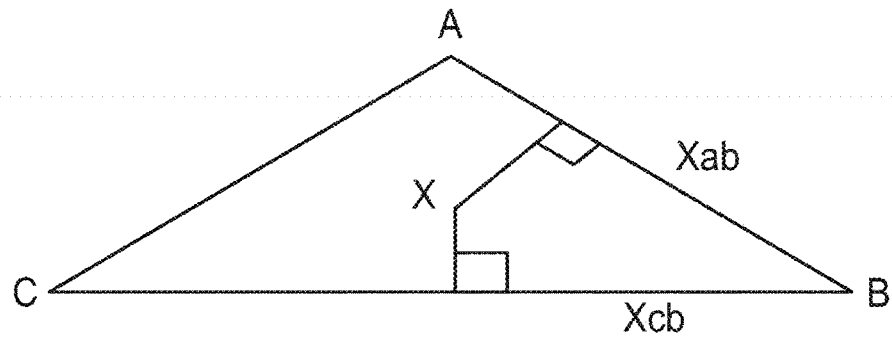
FIG. 24 is an illustration of an example of a triangle and a determined intersection point X of the triangle with the voxel space.

In an alternative embodiment, the process computes where on the triangle is the intersection with the voxel space. FIG. 24 illustrates an example of a triangle and a determined intersection point X of the triangle with the voxel space. Then the process computes the color as follows (see FIG. 24): Having the 3 colors Ca, Cb and Cc associated to the vertices/vectors A, B and C, the intersecting color is $C=\frac{1}{6}* \Sigma_B^A[(Xab*Cb+(AB-Xab)*Ca)/AB+(Xcb*Cb+(CB-Xcb)* Cc)/CB]$, where Xab is the distance from the intersection of the triangle with the voxel space along the AB axis, AB is the distance from a to B and the sum represents the same process applied for A, B and C to obtain a color blend.

While the first alternative is faster, the second alternative provides higher quality results.

Figure 25:
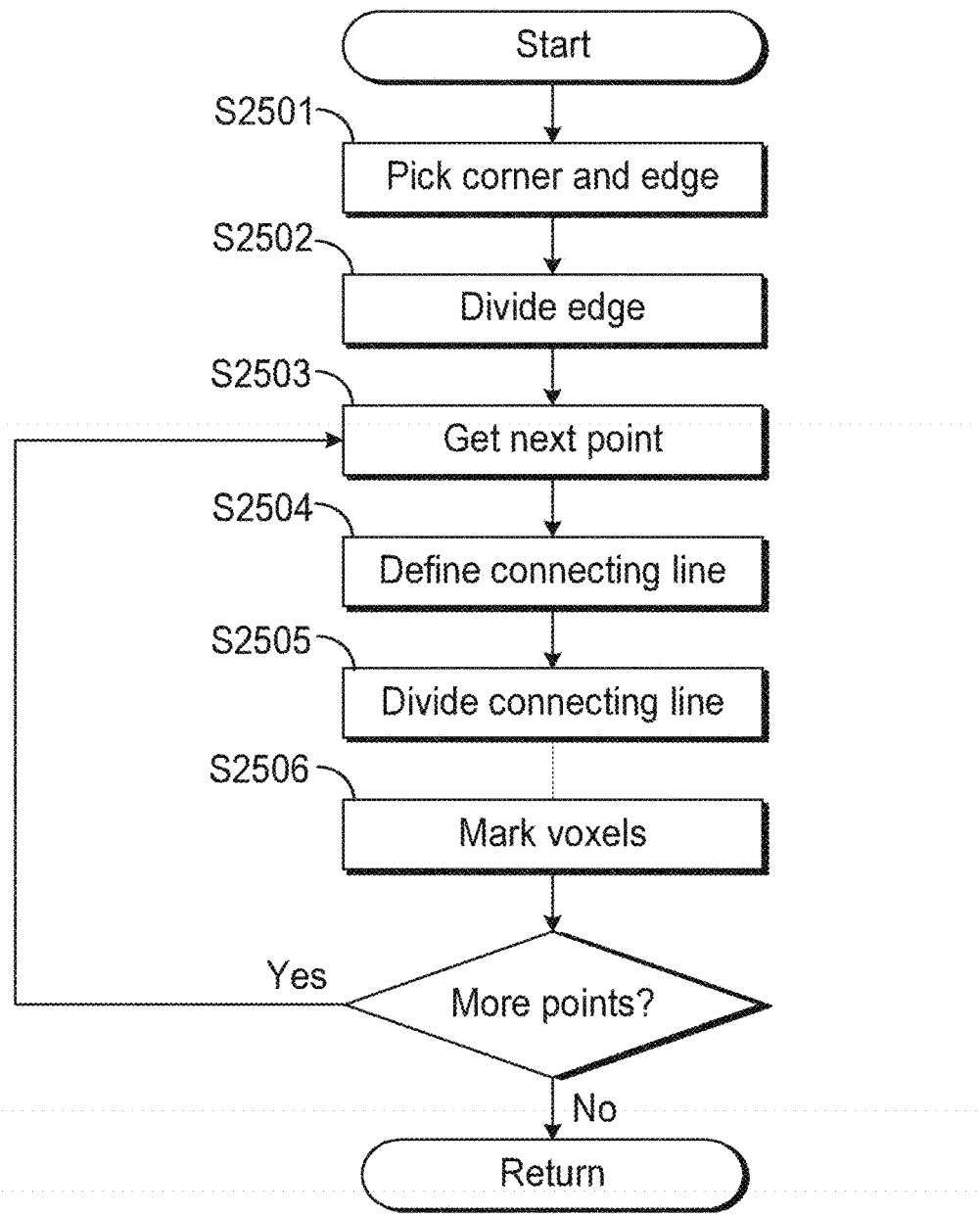
FIG. 25 is a flow diagram of an example of a process for determining the intersection of a mesh with a voxel space.
Figure 26:
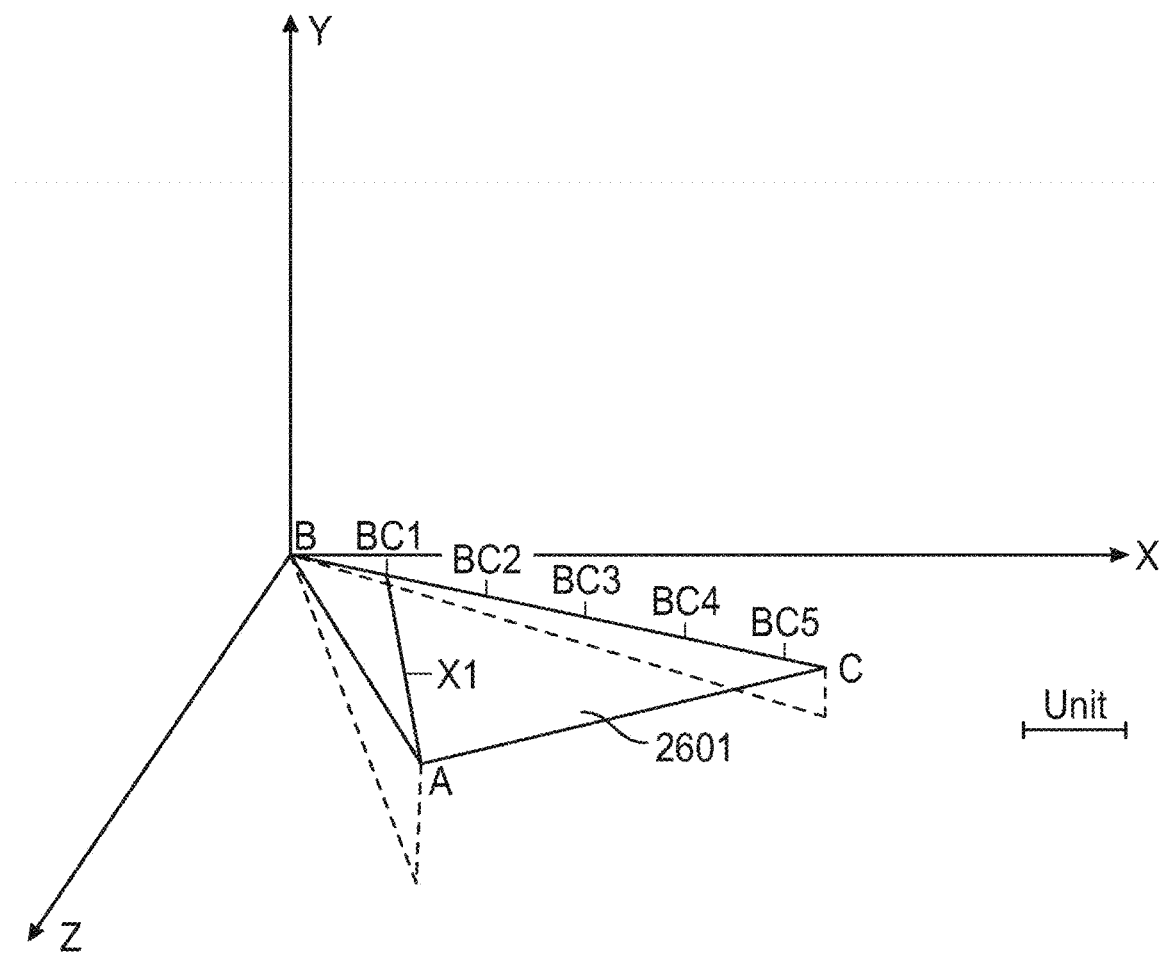
FIG. 26 is an illustration of an example of a voxelization process.

The determination of the intersection of the triangle with the voxel space (step S2304) may be efficiently performed by the process illustrated in FIGS. 25 and 26 and as described as follows. In particular, FIG. 25 illustrates a flow diagram of an example of the process and FIG. 26 illustrates an example of a triangle 2601. Since it is fairly easy to convert a point in space to a coordinate in voxel space, the process to fill the voxels may be based on points on the triangle as illustrated in FIG. 26. The steps of the sub-process, which is performed for each triangle of the mesh, may be summarized as follows:

Step S2501: select one corner (corner A in the example of FIG. 26) and the edge opposite the selected corner (edge BC in the example of FIG. 26).

Step S2502: Define a sequence of points BC1-BC5 that divide the opposite edge (BC) into divisions equal to the smallest dimension of a voxel, e.g. dimy=0.32 in the above example. The points may be defined as end points of a sequence of vectors along edge BC, where each vector has a length equal to the smallest voxel dimension. Since, in 3D, it is highly unlikely to have integer divisions, the last vector will likely end between B and C rather than coincide with C.

The process then processes all points BC1-BC5 defined in the previous step by performing the following steps:

Step S2503: Get next point
Step S2504: The process defines a line connecting the corner (A) picked at step S2501 with the current point on the opposite edge.

Step S2505: The process divides the connecting line into divisions with the size equal to the smallest dimension of a voxel, again dimy=0.32 in the above example. Hence, every point generated by the split of step S2502, connected with the opposite corner of the triangle (A in the example of FIG. 26) forms a line which is to be split in the same way, but starting from the point on the edge (BC) so that the last point that might not fall into the point set because of the non-integer division be A. At last, AC should be split into points.

Step S2506: For every point on the line that was divided at Step S2505 and for point A, the process marks the voxel of the voxel space that contains this point with the raw color computed as described above with reference to step S2305 of FIG. 23. This mapping may be done very efficiently by aligning the model to the voxel space and by dividing the vertex coordinates to the voxel size. The process may allow overriding of voxels. Alternatively, the process may compute weights to determine which triangle intersects a voxel most. However, such a computation is computationally more expensive.

This simple pseudocode shows how the voxel representation of the mesh can be created using just the mesh information. The amount of operations done is not minimal as the points towards the selected corner (selected at Step S2501) tend to be very close to each other and not all of them would be needed. Also the fact that the triangle could be turned at a specific angle would mean that the division done at Step S2506 may take more steps than necessary. However, even though there is a lot of redundancy, the operation is remarkably fast on any device and the complexity of calculations needed to determine the minimum set of points would likely result in having a slower algorithm.

Again referring to FIG. 23, the determination of the closest color from a palette of discrete colors (step S2306) may also be performed in different ways:

In one embodiment, which results in a high quality color mapping, the process initially transforms RGB colors into LAB space. With the LAB representation of colors, the process applies the DeltaE color distance algorithm to compute the distance from the actual color (as determined from the mesh) and the other available colors from the palette. A more detailed description of this method is available at http://en.wikipedia.org/wiki/Color_difference.

In another embodiment, which is faster than the first embodiment, the process calculates the difference between the valid colors of the palette and the given color (as determined from the mesh). The process then selects the color of the palette that corresponds to the shortest distance.

Figure 27:
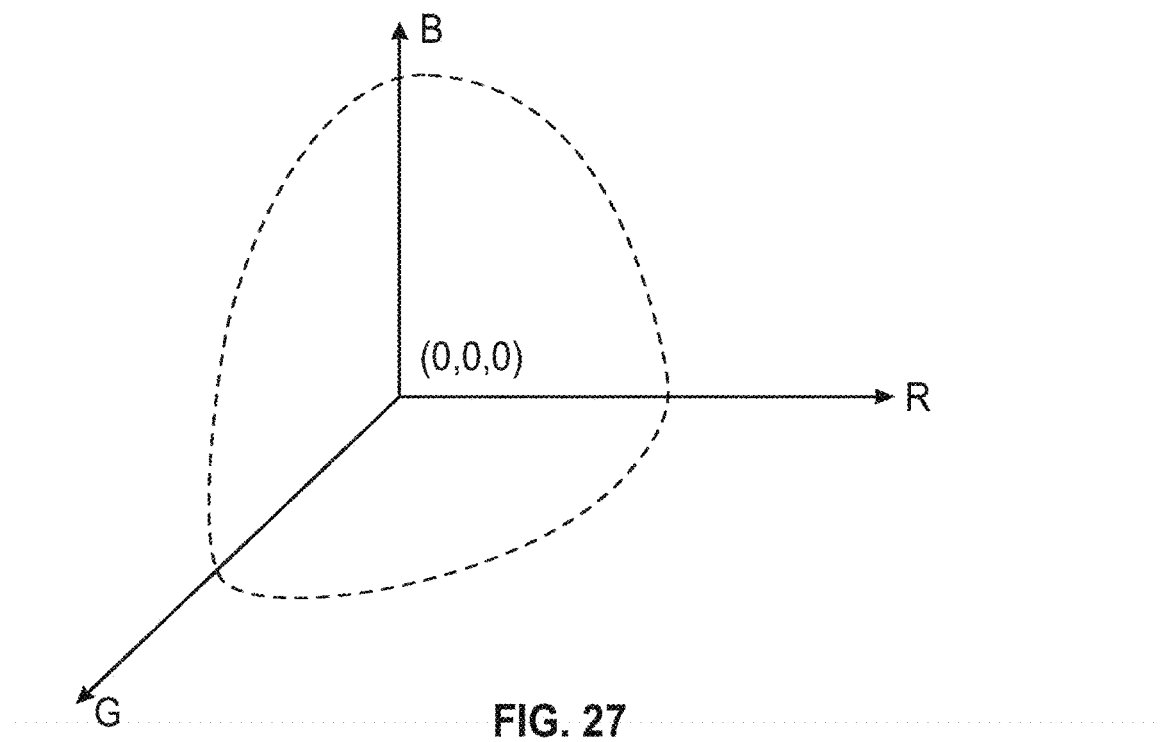
FIG. 27 is an illustration of a color space.

One way to find the shortest distance is to compare all distances in 3D. This means that any color that is to be approximated has to be compared with all possible colors from the palette. A more efficient process for determining the closest distance between a color and the colors of a palette of discrete colors will be described with reference to FIG. 27:

All colors in ROB space may be represented in 3D as an $8^{th}$ of a sphere/ball sectioned by the X, Y and Z planes with a radius of 255. If a color C with components rC, gC, bC containing the red, green and blue components is given as input for the conversion step, color C will be situated at distance D from the origin.

The minimum distance may then be found by an iterative process starting from an initial value of the minimum distance. The maximum distance from the origin to the closest target color from the palette that should be found must be no larger than the distance from the origin to the original color plus the current minimum distance. The initial minimum is thus selected large enough to cover all possible target colors to ensure that at least one match is found.

An example of how the process works is as follows: a current minimum distance is found, meaning that there is a target color that is close to the input color. Now, no target color can be found in such way that it is closer to the original color, yet further away from origin than the distance between the original color and the origin plus the current minimum distance. This follows from the fact that the minimum distance determines the radius of the sphere that has the original color in its center and contains all possible, better solutions. Any better solution should thus be found within said sphere otherwise it would be further away from the original color. Consequently, for a given current minimum distance, only colors need to be analyzed that are at a distance from the origin smaller than the original color distance+the current minimum.

The above conversion process results in a voxel model of the hull/contour of the object or objects. It has been found that the process provides a quality output at an astounding speed because:

If all the units are at maximum distance equal to the minimum size of a voxel, one can't get 2 points that are further away than a voxel so there will never be holes.

If the triangles are small and many and if the model is big, all the small voxel overrides that might give a voxel that does not have the best color for a few voxel will be tolerable.

The color approximation is good enough while at the same time saves a lot of computation power.

This solution may be compared in performance to the standard solutions (raycasting and volume intersection) which instead of just using a given set of points in space try to determine if triangles intersect different volumes of space and, in some cases, some methods even try to calculate the points where the triangle edges intersect the voxels. The volume intersection method is expected to be the slowest, but the intersection points are expected to provide accurate areas of intersection which could potentially facilitate a slightly more accurate coloring of the voxels.

Instead of computing different intersections, another method that is commonly used to determine intersections is called raycasting. Rays can be casted in a grid to determine what mesh is hit by specific rays. The raycasting method is not only slower but also loses a bit of quality as only the triangles hit by the rays contribute to the coloring. The raycasting method could give information about depth and could help more if operations need to be done taking in the consideration the interior of the model.

Again referring to FIG. 21, the mesh-to-voxel conversion of step S2 typically results in a hollow hull, as only voxels intersecting the surface mesh have been marked with colors. In some situations it may be desirable to also map colors onto internal voxels while, in other situations, it may be desirable not to fill out the voxel model. For example, sometimes the model should be empty, e.g. when the model represents a hollow object, e.g. a ball. Moreover, it takes more time to calculate what is the inside volume of the model and it also affects the amount of bricks in the model. This makes all the subsequent steps slower because more information is handled. On the other hand, sometimes, especially if creating landscapes, it is desirable that a model is full rather than just an empty shell.

Accordingly, in the subsequent, optional step S3, the process may fill the internal, non-surface voxels with color information. The main challenge faced when trying to fill the model is that it is generally hard to detect if the voxel that should be filled is inside the model or outside. Ray casting in the voxel world may not always provide a desirable result, because if a voxel ray intersects 2 voxels, this does not mean that all voxels between the two intersection points are inside the model. If the 2 voxels contained, for example very thin triangles, the same voxel could represent both an exit and an entrance.

Raycasting on the mesh can be computationally rather expensive and sometime inaccurate, or it could be accurate but even more expensive, and therefore a voxel based solution may be used for better performance.

It is considerably easier to calculate the outside surface of the model because the process may start with the boundaries of the voxel world. If those points are all taken then everything else is inside. For every voxel that is not occupied because of triangle intersections one can start marking every point that is connected to that point as being a point in the exterior. This procedure can continue recursively and it can fill the entire exterior of the model.

Now that the edge is marked and the exterior is marked, everything in the voxel space that is unmarked (still holds a value of 0) is inside the model.

Now, a voxel raycasting can be done to shoot rays by any axis and fill in any unoccupied voxel. Currently, the color of voxel that intersects the entering ray is used to color the interior. As the mesh holds no information about how should the interior be colored, this coloring could be changed to be application specific.

In subsequent, optional step S4, the created voxel representation may be post-processed, e.g. trimmed. For example, such a post-processing may be desirable in order to make the voxel representation more suitable for conversion into a virtual toy construction model. For example, toy construction elements of the type known as LEGO often have coupling knobs. When the volume defined by the mesh is not too big, an extra knob could make a huge difference for the overall appearance of the model; therefore, for bodies with volumes less than a certain volume, an extra trimming process may be used. For example, the minimum volume may be selected as 1000 voxels or another suitable limit.

The trimming process removes the voxel on top of another voxel; if there is only one voxel that exists freely it is removed also. This is done because the LEGO brick also has knobs that connect to other bricks. Since the knob of the last brick on top is sticking out it could mark another voxel but we might not want to put a brick there because it will make the already existing small model even more cluttered. For this reason the extra trimming process may optionally be used for small models. Of course, it could also be used on bigger models but it will introduce extra operations that might not provide observable results.

The trimming process may e.g. be performed as follows: For every occupied voxel, the process checks if there is an occupied voxel on top; if not, it marks the occupied voxel for deletion. Either lonely voxels or the top most voxels will be removed this way. The voxels on top are collected and removed all at the same time because if they would remove themselves first the voxel underneath might appear as the top-most voxel.

After the voxel space is filled (and, optionally, trimmed), either just the contour or the interior also, some embodiments of the process may create a virtual environment directly based on the voxel representation while other embodiments may create a toy construction model as described herein.

Accordingly, in the subsequent step S5, the process parses the voxel space and creates a data structure, e.g. a list, of bricks (or of other types toy construction elements). It will be appreciated that, if a raw voxel representation of a virtual environment is desired, alternative embodiments of the process may skip this step.

In order to obtain the bricks that can be placed, a brick evolution model is used, i.e. a process that starts with a smallest possible brick (the 3024, 1×1 plate in the above example) and seeks to fit larger bricks starting from the same position. Hence the initial smallest possible brick is caused to evolve into other types of bricks. This can be done recursively based on a hierarchy of brick types (or other types of toy construction elements). Different bricks are chosen to evolve into specific other bricks. To this end the process may represent the possible evolution paths by a tree structure. When placing a brick the process will try to evolve the brick until it cannot evolve anymore because there is no other brick it can evolve into or because there are no voxels with the same color it can evolve over.

An example of this would be a 1×1 Plate is placed in the origin. It will try to evolve into a 1×1 Brick by looking to see if there are 2 voxels above it that have the same color. Assuming there is only one and therefore it cannot evolve in that direction, the process will then try to evolve the brick into a 1×2 Plate in any of the 2 positions (normal, 90 degree rotated around the UP axis). If the brick is found to be able to evolve into a 1×2 plate then the process will continue until it will run out of space or evolution possibilities. In one embodiment, the supported shapes are 1×1 Plate, 1×2 Plate, 1×3 Plate, 1×1 Brick, 1×2 Brick, 1×3 Brick, 2×2 Plate, 2×2 Brick, but more or other shapes can be introduced in alternative embodiments.

After the brick evolution of a brick has finished, the process clears the voxel space at the location occupied by the evolved brick. This is done in order to avoid placing other bricks at that location. The process then adds the evolved brick to a brick list.

The list of bricks thus obtained contains information about how to represent the bricks in a digital world with digital colors.

Optionally, in subsequent step S6, the process modifies the created toy construction model, e.g. by changing attributes, adding game-control elements and/or the like as described herein. This conversion may be at least in part be performed based on detected physical properties of the real world scene, e.g. as described above.

In subsequent step S7, the process creates a suitable output data structure representing the toy construction model. For example, in one embodiment, the bricks may be converted into bricks that are suitable to be expressed as an LXFML file. This means that a transformation matrix may need to be calculated and optionally, the colors may need to be converted to a valid color selected from a predetermined color palette (if not already done in the previous steps).

The transform matrix may be built to contain the rotation as a quaternion, the position and the scale (see e.g. http://www.euclideanspace.com/maths/geometry/affine/matrix4x4/for more detailed information on matrices and http://www.euclideanspace.com/maths/geometry/rotations/conversions/quaternionToMatrix/more info on quaternion transformation). All the bricks may finally be written in a suitable data format, e.g. in the way described above for the case of an LXMF format.

Figure 28:
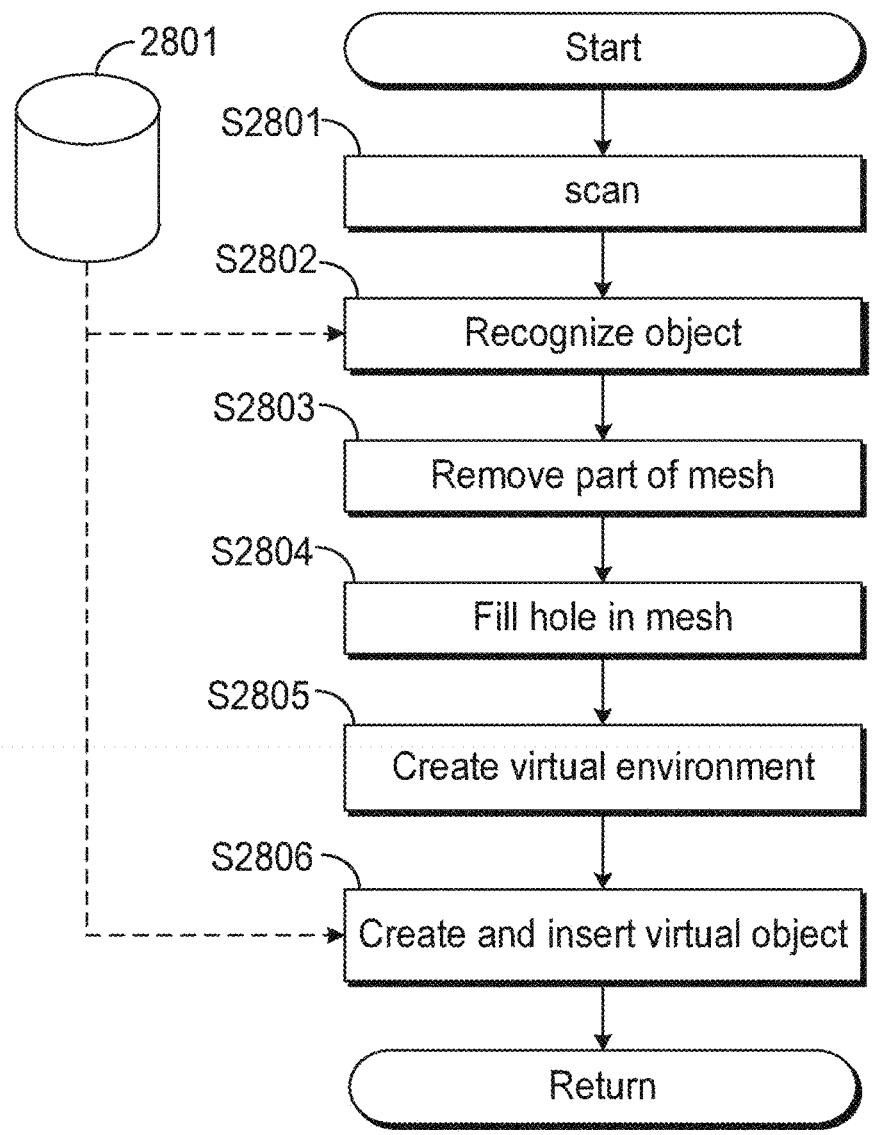
FIG. 28 is another example of a process for creating a virtual environment.
Figure 29A:
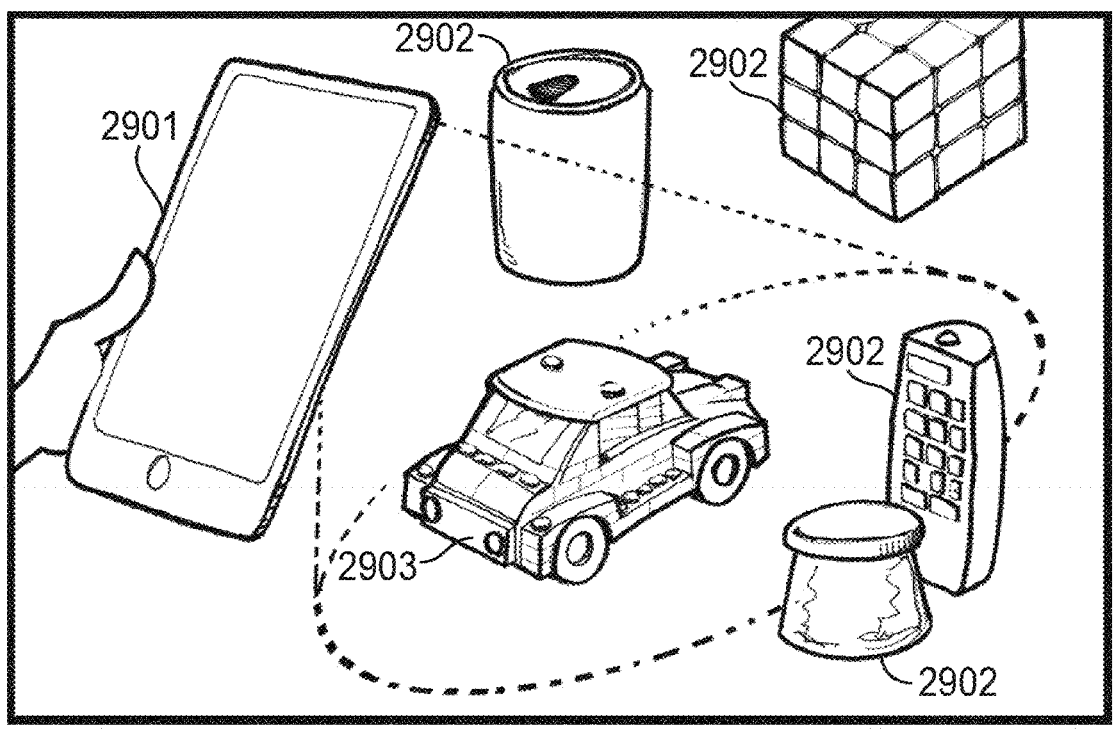
FIGS. 29A-B show the steps of creating a virtual game environment from a physical model according to a further embodiment.
Figure 29B:
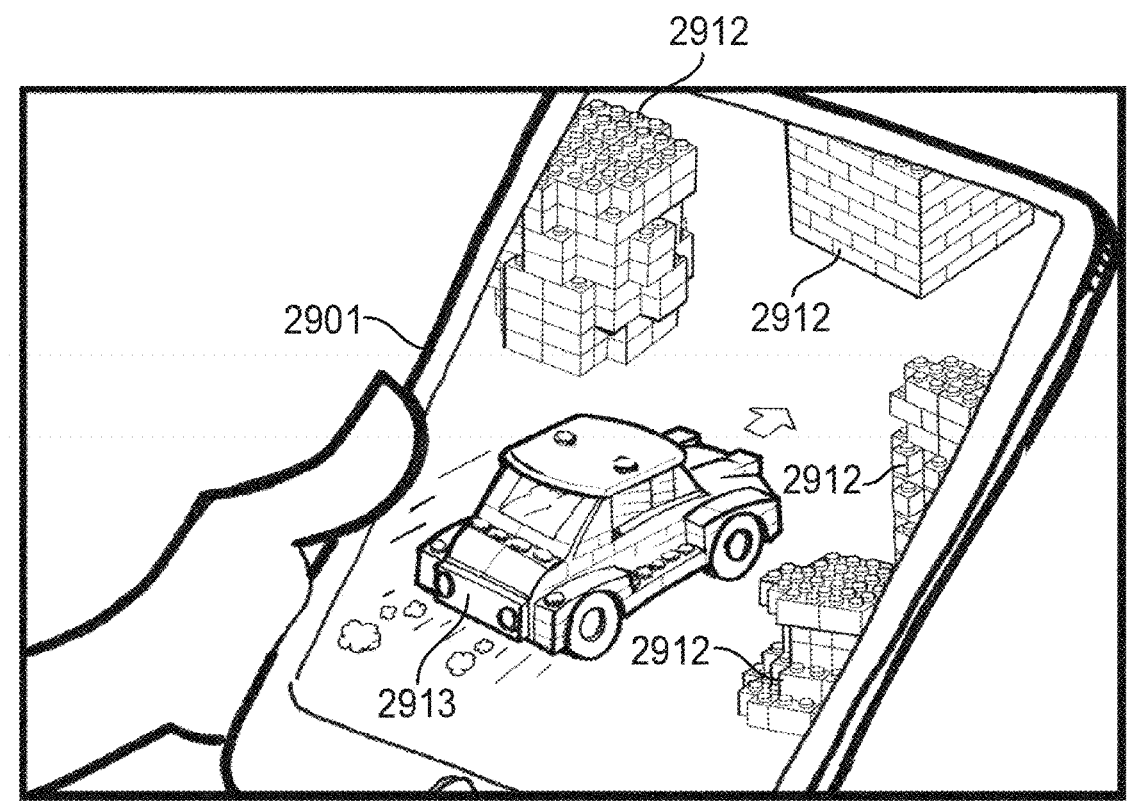
Figure 30:
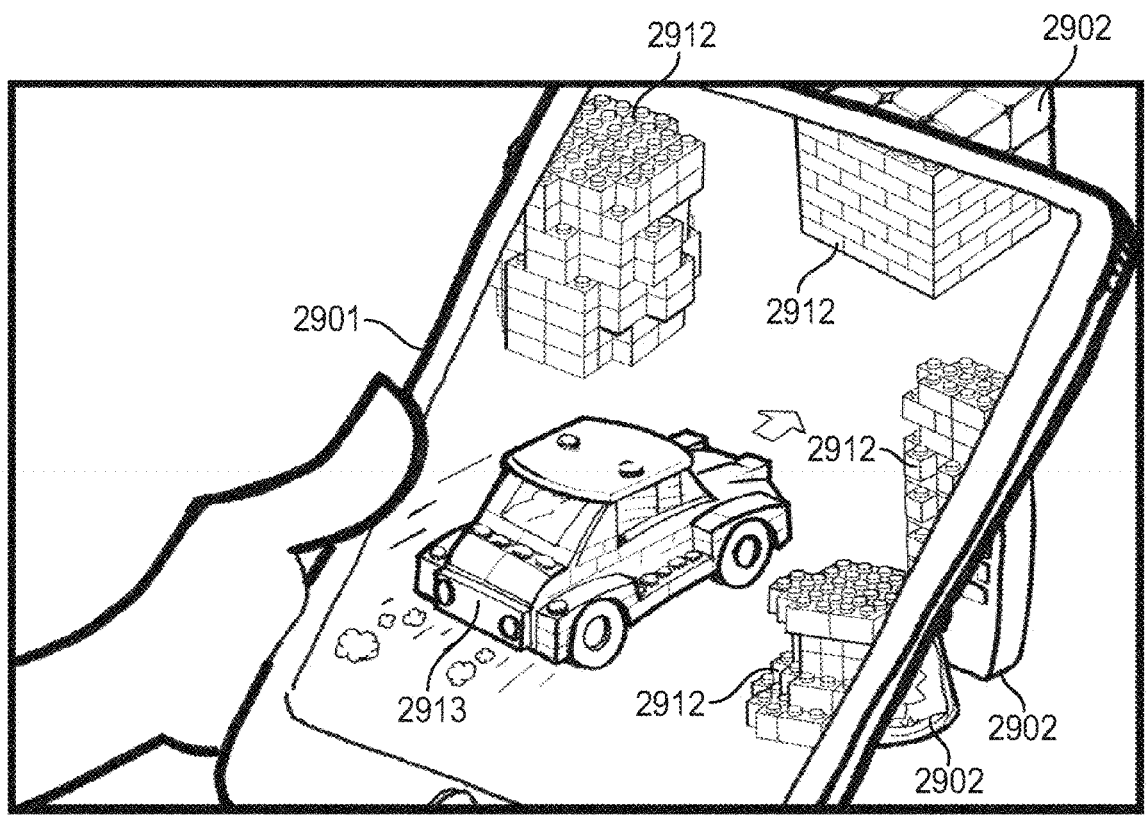
FIG. 30 shows the steps of creating a virtual game environment from a physical model according to a further embodiment.

With reference to FIGS. 28, 29A-B and 30, another embodiment of a process for creating a virtual game environment from a physical model will now be described. In particular, FIG. 28 shows a flow diagram of another embodiment of a process for creating a virtual game environment from a physical model and FIGS. 29A-B and 30 illustrate examples of steps of creating a virtual game environment from a physical model according to a further embodiment.

In initial step S2801, the process obtains scan data, i.e. a digital three-dimensional representation of the physical model, e.g. as obtained by scanning the physical model by means of a camera or other capturing device as described herein. The digital three-dimensional representation may be in the form of a surface mesh as described herein FIG. 29A illustrates an example of a scanning step for creating a virtual model from a physical model of a scene. The physical model of the scene comprises physical objects 2902 and 2903 arranged on a table or similar play zone. A mobile device 2901 is moved along a scanning trajectory while capturing image/scan data of the physical model. In this example, the physical objects include a number of everyday objects 2902 and a physical toy construction model 2903 of a car.

In step S2802, the process recognizes one or more physical objects as known physical objects. To this end, the process has access to a library 2801 of known physical objects, e.g. a database including digital three-dimensional representations of each known object and, optionally, additional information such as attributes to be assigned to the virtual versions of these objects, such as functional attributes, behavioral attributes, capabilities, etc. In the example of FIGS. 29A-B, the process recognizes the physical toy construction model 2903 as a known toy construction model.

In step S2803, the process removes the triangles (or other geometry elements) from the mesh that correspond to the recognized object, thus creating a hole in the surface mesh.

In step S2804, the process fills the created hole by creating triangles filling the hole. The shape and colors represented by the created triangles may be determined by interpolating the surface surrounding the hole. Alternatively, the created surface may represent colors simulating a shadow or after-glow of the removed object.

In subsequent step S2805, the process creates a virtual environment based on the thus modified mesh, e.g. by performing the process of FIG. 21.

In subsequent step S2806, the process creates a virtual object based on the information retrieved from the library of know objects. For example, the virtual object may be created as a digital three-dimensional representation of a toy construction model. The virtual object may then be inserted into the created virtual environment at the location where the mesh has been modified, i.e. at the location where the object had been recognized. The virtual object is thus not merely a part of the created landscape or environment but a virtual object (e.g. a virtual item or character) that may move about the virtual environment and/or otherwise interact with the created environment. FIG. 29B illustrates an example of the created virtual environment where the physical objects 2902 of the real-world scene are represented by a virtual toy construction model 2912 as described herein. Additionally, a virtual object 2913 representing the recognized car is placed in the virtual environment as a user-controllable virtual object that may move about the virtual environment in response to user inputs. The virtual environment of FIG. 29 is stored on the mobile device or on a remote system, e.g. in the cloud so as to allow the user to engage in digital game play using the virtual environment even when the user is no longer in the vicinity of the physical model or when the physical model no longer exists. It will be appreciated that the process may also be performed in an augmented reality context, where the virtual environment is displayed in real time while the user captures images of the physical model, e.g. as illustrated in FIG. 30.

Figure 31:
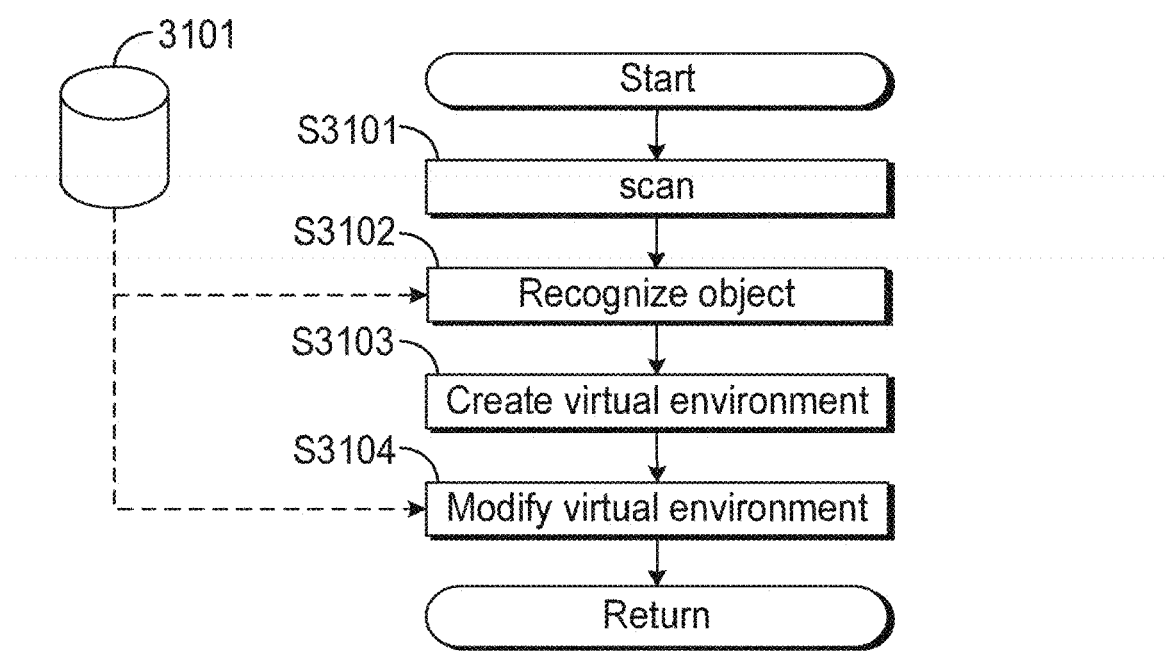
FIG. 31 shows another example of a process for creating a virtual environment.

FIG. 31 shows a flow diagram of another embodiment of a process for creating a virtual game environment from a physical model.

In initial step S3101, the process obtains scan data, i.e. a digital three-dimensional representation of the physical model, e.g. as obtained by scanning the physical model by means of a camera or other capturing device as described herein. The digital three-dimensional representation may be in the form of a surface mesh as described herein.

In step S3102, the process recognizes one or more physical objects as known physical objects. To this end, the process has access to a library 3101 of known physical objects, e.g. a database including information such as information about a predetermined theme or conversion rules that are associated with and should be triggered by the recognized object.

In subsequent step S3103, the process creates a virtual environment based on the thus modified mesh, e.g. by performing the process of FIG. 21.

In subsequent step S3104, the process modifies the created virtual environment by applying one or more conversion rules determined from the library and associated with the recognized object.

It will be appreciated that, in some embodiments, the process may, responsive to recognizing a physical object, both modify the virtual environment as described in connection with FIG. 31 and replace the recognized object by a corresponding virtual object as described in connection with FIG. 28.

Embodiments of the method described herein can be implemented by means of hardware comprising several distinct elements, and/or at least in part by means of a suitably programmed microprocessor.

In the claims enumerating several means, several of these means can be embodied by one and the same element, component or item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, elements, steps or components but does not preclude the presence or addition of one or more other features, elements, steps, components or groups thereof.

What is claimed is:

1. A computer-implemented method of creating a digital three-dimensional representation of an object, the method comprising:
   receiving a digital three-dimensional representation of a surface of the object, the digital three-dimensional representation of the surface comprising at least one surface element, the surface element comprising a boundary and a surface area surrounded by said boundary;
   mapping the surface onto a plurality of voxels; and
   creating the digital three-dimensional representation of the object from the identified voxels,
   wherein mapping comprises:
      for each surface element, defining a plurality of points within said surface element, wherein at least a subset of said plurality of points lie within the surface area of the surface element;
      assigning each of the plurality of points to a corresponding voxel, and
      determining a voxel color for the corresponding voxel by:
         identifying a target color of a predetermined set of colors, the target color representing an input color, by:
            representing the input color and each color of the set of predetermined colors in a three-dimensional color space, wherein all colors of the set of colors lie within a ball having an origin and a radius;
            determining a current candidate color from the predetermined set of colors; and
            analyzing a subset of the predetermined set of colors to identify an updated candidate color from the subset of the predetermined set of colors wherein the updated candidate color has a smaller distance to the input color than the current candidate color and wherein the subset of the predetermined set of colors only comprises colors of the predetermined set of colors that have a distance from the origin which is no larger than a sum of the distance between the input color and the origin and the distance between the input color and the current candidate color,
wherein he surface element is a triangle and the plurality of points are defined by:
selecting a first sequence of points on a first edge of the triangle;
for each point of the first sequence, defining an associated straight line connecting said point and the corner of the triangle that is opposite the first edge; and
for each associated straight line, selecting a sequence of further points on said straight line.

2. The method according to claim 1, wherein the plurality of points define a triangular planar grid having the plurality of points as grid points of the triangular planar grid where each triangle of the grid has a smallest edge no larger than a minimum linear extent of the voxels and a largest edge no larger than twice the minimum linear extent.

3. A computer-implemented method of creating a digital three-dimensional representation of a toy object, the method comprising;
receiving a mesh representation of the toy object, the mesh representation formed by a plurality of mesh triangles,
selecting a corner, and an edge opposite the selected corner of a mesh triangle of the plurality of mesh triangles;
defining a sequence of points that divide the edge opposite the selected corner into divisions equal to a voxel dimension;
processing the sequence of points by:
defining a connecting line between the corner to a point of the sequence of points; and
dividing the connecting line into divisions equal to the voxel dimension:
marking a voxel in voxel space based on the corner, the division of the edge opposite the selected corner, and the division of the connecting line;
computing a raw voxel color to be assigned to the marked voxel based on the color of the mesh triangle of the plurality of mesh triangles; and
compiling a plurality of marked voxels to compose a digital three-dimensional representation of the toy object,
wherein computing the raw voxel color includes:
identifying a target color of a predetermined set of colors, the target color representing an input color, by:
representing the input color and each color of the set of predetermined colors in a three-dimensional color space, wherein all colors of the set of colors lie within a ball haying an origin and a radius;
determining a current candidate color from the predetermined set of colors; and
analyzing a subset of the predetermined set of colors to identify an updated candidate color from the subset of the predetermined set of colors wherein the updated candidate color has a smaller distance to the input color than the current candidate color and wherein the subset of the predetermined set of colors only comprises colors of the predetermined set of colors that have a distance from the origin which is no larger than a sum of the distance between the input color and the origin and the distance between the input color and the current candidate color.

4. The computer-implemented method of claim 3, wherein the divisions equal to the voxel dimension are equal to a vertical dimension of 0.32 cm, equivalent to a vertical dimension of a modular toy construction element.

5. The computer-implemented method of claim 3, wherein the sequence of points are defined as end points of a sequence of vectors along the edge opposite the selected corner, each vector having a length equal to the voxel dimension.

6. The computer-implemented method of claim 3, further comprising defining and dividing an edge of the mesh triangle beginning from the corner and an end of the edge opposite of the corner into divisions equal to the voxel dimension.

7. The computer-implemented method of claim 3, further comprising converting the compiled plurality of marked voxels into a virtual toy construction model.

8. The computer-implemented method of claim 7, wherein the virtual toy construction model defines virtual toy construction elements.

9. A computer-implemented method of creating a digital three-dimensional representation of a toy object, the method comprising:
receiving a mesh representation of the toy object, the mesh representation formed of a plurality of triangles;
for each triangle of the mesh representation, imposing a grid thereon, the bounds of cells of the grid corresponding to dimensions of a voxel;
marking a voxel based on the grid;
compiling marked voxels to form a voxel space of the mesh representation of the toy object; and
mapping a voxel color to the marked voxel by aligning voxel space with the mesh representation and deriving a voxel color from the mesh representation, thereby forming a digital three-dimensional representation of the toy object,
wherein deriving a voxel color from the mesh representation comprises:
identifying a target color of a predetermined set of colors, the target color representing an input color, by:
representing the input color and each color of the set of predetermined colors in a three-dimensional color space, wherein all colors of the set of colors lie within a ball haying an origin and a radius;
determining a current candidate color from the predetermined set of colors; and
analyzing a subset of the predetermined set of colors to identify an updated candidate color from the subset of the predetermined set of colors wherein the updated candidate color has a smaller distance to the input color than the current candidate color and wherein the subset of the predetermined set of colors only comprises colors of the predetermined set of colors that have a distance from the origin which is no larger than a sum of the distance between the input color and the origin and the distance between the input color and the current candidate color.

10. The computer-implemented method of claim 9, further comprising converting the three-dimensional representation of the toy object into a virtual toy construction model.

11. The computer-implemented method of claim 10, wherein the virtual toy construction model defines virtual toy construction elements.

\* \* \* \* \*